United States Patent
Iino et al.

(10) Patent No.: US 10,550,893 B2
(45) Date of Patent: Feb. 4, 2020

(54) ROLLING BEARING

(71) Applicant: SEIKO INSTRUMENTS INC., Chiba-shi, Chiba (JP)

(72) Inventors: Akihiro Iino, Chiba (JP); Tatsumi Yamada, Chiba (JP); Noritoshi Yuura, Chiba (JP); Haruhiko Hasegawa, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 0 days.

(21) Appl. No.: 15/953,048

(22) Filed: Apr. 13, 2018

(65) Prior Publication Data

US 2018/0306243 A1    Oct. 25, 2018

(30) Foreign Application Priority Data

Apr. 19, 2017   (JP) ................. 2017-082857
Dec. 26, 2017   (JP) ................. 2017-250166

(51) Int. Cl.
| | |
|---|---|
| F16C 35/06 | (2006.01) |
| F16C 35/067 | (2006.01) |
| F16H 57/00 | (2012.01) |
| F16C 19/06 | (2006.01) |

(52) U.S. Cl.
CPC ....... F16C 35/067 (2013.01); F16H 57/0031 (2013.01); *F16C 19/06* (2013.01); *F16C 2226/76* (2013.01); *F16C 2361/61* (2013.01)

(58) Field of Classification Search
CPC .... F16C 35/067; F16C 2326/02; F16C 19/06; F16C 2361/61; F16C 2226/76; F16C 2226/78; F16C 13/006; B65G 9/002; F16H 57/0031
See application file for complete search history.

(56) References Cited

U.S. PATENT DOCUMENTS

| | | | | |
|---|---|---|---|---|
| 2,230,744 | A | * | 2/1941 | Disbro ................. E05D 15/063 16/107 |
| 3,941,495 | A | * | 3/1976 | Duncan ............. B29C 45/14754 403/267 |
| 4,490,128 | A | * | 12/1984 | Weiss ................. B60B 33/0028 29/892 |
| 4,580,757 | A | * | 4/1986 | Dobhan ............. B29C 45/1459 249/88 |
| 4,602,875 | A | * | 7/1986 | Doerr .................... F16C 13/006 384/477 |
| 4,973,292 | A | * | 11/1990 | Mevissen ............... F16H 55/36 474/192 |

(Continued)

FOREIGN PATENT DOCUMENTS

| | | | | |
|---|---|---|---|---|
| JP | 05248515 | A | * 9/1993 | ........... F16C 35/067 |
| JP | 6087717 | | 12/1994 | |

(Continued)

*Primary Examiner* — Alan B Waits
(74) *Attorney, Agent, or Firm* — Adams & Wilks

(57) ABSTRACT

Provided is a bearing having a plurality of rolling elements disposed between an inner ring and an outer ring that are disposed coaxially, wherein a groove section extending in a circumferential direction of an outer circumferential surface of the outer ring outside in a radial direction is formed on the outer circumferential surface, and an enveloping layer formed of any one of rubber, a thermoplastic elastomer and a plastic is formed on the outer circumferential surface.

8 Claims, 8 Drawing Sheets

(56) References Cited

U.S. PATENT DOCUMENTS

| | | | | |
|---|---|---|---|---|
| 5,630,769 | A * | 5/1997 | Schmidt | B60B 5/02 474/167 |
| 5,931,755 | A * | 8/1999 | Mailey | B29C 45/0005 474/161 |
| 6,093,478 | A * | 7/2000 | Jasinetzky | B22D 19/00 264/259 |
| 6,482,140 | B1 * | 11/2002 | Takatsu | B29C 45/14311 152/393 |
| 6,645,415 | B2 * | 11/2003 | Takatsu | B29C 45/14311 264/255 |
| 6,860,639 | B2 * | 3/2005 | Tabuchi | B29C 45/1459 384/476 |
| 7,011,593 | B2 * | 3/2006 | Schenk | F16C 13/006 384/477 |
| 7,895,748 | B2 * | 3/2011 | Nomura | B29C 33/0077 264/299 |
| 8,702,178 | B2 * | 4/2014 | Breyer | B65G 9/002 198/495 |
| 9,702,399 | B2 * | 7/2017 | Arnault | B29C 45/1459 |
| 2001/0053257 | A1 * | 12/2001 | Takatsu | B29C 45/14311 384/543 |
| 2002/0021043 | A1 * | 2/2002 | Hagiwara | F16H 55/17 301/6.5 |
| 2003/0059143 | A1 * | 3/2003 | Pairone | D06F 37/00 384/537 |
| 2003/0132677 | A1 * | 7/2003 | Tabuchi | B29C 45/1459 310/90 |
| 2004/0044115 | A1 * | 3/2004 | Arai | C08K 3/24 524/493 |
| 2005/0026729 | A1 * | 2/2005 | Schenk | F16C 13/006 474/101 |
| 2010/0184548 | A1 * | 7/2010 | Langlois | B29C 45/0025 474/190 |
| 2010/0284642 | A1 * | 11/2010 | Mineno | F16C 35/067 384/569 |
| 2011/0147332 | A1 * | 6/2011 | Breyer | B65G 9/002 212/346 |
| 2012/0142468 | A1 * | 6/2012 | Lescorail | F16C 13/006 474/136 |
| 2013/0051718 | A1 * | 2/2013 | Katayama | F16C 33/7823 384/477 |
| 2013/0118299 | A1 * | 5/2013 | Pallini | B21D 51/2669 74/569 |
| 2014/0029881 | A1 * | 1/2014 | Wassenhoven | D01H 4/12 384/456 |
| 2014/0357439 | A1 * | 12/2014 | Schaefer | F16H 55/48 474/168 |
| 2015/0055907 | A1 * | 2/2015 | Evans | F16C 25/08 384/569 |
| 2015/0345615 | A1 * | 12/2015 | Beisel | F16H 57/0471 74/468 |
| 2016/0245389 | A1 * | 8/2016 | Albrecht | F16H 55/40 |

FOREIGN PATENT DOCUMENTS

| | | | | |
|---|---|---|---|---|
| JP | 2001116052 | A * | 4/2001 | F16C 35/067 |
| JP | 2004011730 | A * | 1/2004 | F16C 35/067 |
| JP | 2008050902 | A * | 3/2008 | F16C 35/067 |
| JP | 2010084817 | A * | 4/2010 | F16C 35/067 |

* cited by examiner

ROLLING BEARING

CROSS-REFERENCE TO RELATED APPLICATION

Priority is claimed on Japanese Patent Application No. 2017-082857, filed Apr. 19, 2017, and Japanese Patent Application No. 2017-250166, filed Dec. 26, 2017, the contents of which are incorporated herein by reference.

BACKGROUND OF THE INVENTION

Field of the Invention

The present invention relates to a rolling bearing and a drive module.

Description of Related Art

For example, as a use of a rolling bearing, conveying a conveyance object such as a bill, a ticket, or the like using an outer ring of a rolling bearing, or rolling the rolling bearing along a contact object as a wheel of a moving body is known. In this case, in order to increase a frictional force with a conveyance object or a contact object with an outer circumferential surface of the outer ring or decrease sound (noise) when an outer ring is operated while in rolling contact, the outer ring is coated with a urethane rubber.

The urethane rubber has good wear resistance, and further, can be strongly adhered and fixed to the outer ring. A manufacturing process of mounting the urethane rubber on the outer ring is as follows.

First, the outer circumferential surface of the outer ring of the rolling bearing is processed to become rough through sandblast processing, and an adhesive agent is applied on the outer circumferential surface that is processed to become rough. Next, the rolling bearing is set in a mold, a urethane raw material (a liquid) flows between the outer circumferential surface and the mold, and molding is performed by applying a pressure to the mold. Next, the urethane raw material is maintained in the mold at a high temperature for a predetermined time (about half of a day to one day according to hardness). A high temperature is applied to the adhesive agent and the urethane rubber is vulcanized and adhered to the outer circumferential surface while curing the urethane rubber at a high temperature. After vulcanized adhesion, the outer circumferential surface of the urethane is accurately finished with a predetermined dimension through polishing. Accordingly, the outer circumferential surface of the outer ring of the rolling bearing is coated with the urethane rubber (for example, see Japanese Utility Model Publication No. H06-87717).

SUMMARY OF THE INVENTION

However, the rolling bearing of the related art has the following problems.

That is, the urethane rubber should be cured in the mold for a long time, application of the adhesive agent to the outer circumferential surface of the outer ring is time-consuming, and the outer circumferential surface of the urethane should be accurately finished with a predetermined dimension through polishing after curing of the urethane rubber.

Accordingly, when mass production of the rolling bearing having the outer circumferential surface coated with the urethane rubber is performed, a great amount of equipment for coating the outer circumferential surface with the urethane rubber should be provided, and equipment cost is increased. In addition, a process in which an outer circumferential surface of the outer ring is processed to become rough through sandblast or a process of applying an adhesive agent to the roughly processed outer circumferential surface is needed. For this reason, it is difficult to manufacture the rolling bearing coated with the urethane rubber at a low cost in large quantities.

In consideration of the above-mentioned circumstances, an aspect according to the present invention is to provide a bearing and a drive module so that the bearing including an enveloping layer can be manufactured at a low cost in large quantities.

In order to solve the above-mentioned problems, the present invention employs the following aspects.

(1) A bearing according to an aspect of the present invention is a bearing having a plurality of rolling elements disposed between an inner ring and an outer ring that are disposed coaxially, wherein a groove section extending in a circumferential direction of an outer circumferential surface of the outer ring outside in a radial direction is formed on the outer circumferential surface, and an enveloping layer formed of any one of rubber, a thermoplastic elastomer and a plastic is formed on the outer circumferential surface.

According to the aspect of (1), the groove section is formed on the outer circumferential surface of the outer ring, and the enveloping layer is formed of any one of rubber, a thermoplastic elastomer and a plastic on the outer circumferential surface. Accordingly, the groove section of the outer circumferential surface is filled with a protrusion of the enveloping layer, and the groove section of the outer circumferential surface and the protrusion of the enveloping layer can be engaged with each other in a concavo-convex shape. Accordingly, when a force is applied to the enveloping layer, removal of the enveloping layer from the outer ring can be prevented by a concavo-convex structure between the outer circumferential surface and the enveloping layer.

In addition, a process in which the outer circumferential surface of the outer ring is processed to become rough through sandblast or a process of applying an adhesive agent to the roughly processed outer circumferential surface may be unnecessary.

In particular, in the case of thermoplastic elastomer, as with urethane rubber, it is possible to eliminate a long curing process in the mold.

Accordingly, the bearing having the enveloping layer formed on the outer circumferential surface of the outer ring can be manufactured at a low cost in large quantities.

(2) According to the aspect of (1), the groove section may have a deepest area further inside than the outer circumferential surface in the radial direction, and a groove width dimension may be gradually reduced from the outer circumferential surface side to the deepest area.

According to the aspect of (2), as the groove width dimension is gradually reduced from the outer circumferential surface side to the deepest area, the bottom surface of the groove section can have no flat section. Accordingly, a cutting resistance when the groove section is processed by a cutting edge can be minimized to a small level, and processing of the groove section becomes easy. Further, a lifespan of the cutting edge can be extended by minimizing the cutting resistance of the cutting edge to a small level.

In addition, as the groove width dimension is formed to be gradually reduced from the outer circumferential surface side to the deepest area, an influence of deformation of the outer ring or a decrease in rigidity of the outer ring due to the groove section on the rolling surface can be minimized.

(3) In the aspect of (1) or (2), the groove section may be formed symmetrically with respect to a center of the outer ring in an axial direction.

According to the aspect of (3), the groove section is formed at a center of the outer circumferential surface of the outer ring with good balance. Accordingly, an influence of deformation of the outer ring or a decrease in rigidity of the outer ring due to the groove section on the rolling surface can be minimized.

(4) In the aspect of (3), a plurality of groove sections may be formed at both sides of the center, and a groove depth dimension of the outer groove section of the plurality of groove sections when seen from the center may be larger than a groove depth dimension of the inner groove section.

According to the aspect of (4), as the plurality of groove sections are formed at both sides of the center of the outer ring, the outer groove section is disposed at a position farther away from a center in the axial direction (i.e., the rolling surface) than the groove section of the inner side. Accordingly, even when the groove depth dimension of the outer groove section is larger than the groove depth dimension of the inner groove section, an influence of deformation of the outer ring or a decrease in rigidity of the outer ring due to the groove section on the rolling surface can be minimized.

In addition, by making the groove depth dimension of the outer groove section larger than that of the inner groove section, the enveloping layer can be more strongly engaged with the outer circumferential surface by the concavo-convex structure between the outer circumferential surface and the enveloping layer, and separation of the enveloping layer from the outer circumferential surface (i.e., the outer ring) can be prevented.

Further, by making the groove depth dimension of the inner groove section smaller than that of the outer groove section, the cutting resistance when the inner groove section is processed by the cutting edge can be minimized to a small level, and processing of the groove section of the inner side becomes easy. Further, a lifespan of the cutting edge can be extended by minimizing the cutting resistance of the cutting edge to a small level.

(5) In the aspect of any one of (1) to (4), the outer ring may have step sections formed on both of end surfaces in the axial direction.

According to the aspect of (5), as the step sections are formed on both end surfaces of the outer ring, the step section can be filled with any one of rubber, a thermoplastic elastomer and a plastic. Accordingly, the step section of the outer circumferential surface is filled with the protrusion of the enveloping layer, and the step section of the outer circumferential surface and the protrusion of the enveloping layer can be engaged with each other in a concavo-convex shape. Accordingly, when a force is applied to the enveloping layer, removal of the enveloping layer from the outer ring can be prevented by a concavo-convex structure between the outer circumferential surface and the enveloping layer.

In addition, for example, when a moment load that causes the enveloping layer to be separated from the outer circumferential surface is applied to the coated side surface of the enveloping layer, stripping-off of the enveloping layer from the outer circumferential surface and removal of the enveloping layer from the outer ring can be prevented by the area filled in the step section. Accordingly, separation of the enveloping layer from the outer circumferential surface can be more appropriately prevented.

(6) In the aspect of (5), a depth dimension of the step section may be larger than the groove depth dimension of the groove section.

According to the aspect of (6), as the depth dimension of the step section is larger than the groove depth dimension of the groove section, the enveloping layer can be more strongly engaged with the outer circumferential surface by a concavo-convex structure between the outer circumferential surface and the enveloping layer, and separation of the enveloping layer from the outer circumferential surface (i.e., the outer ring) can be more appropriately prevented.

In addition, the step sections are formed on both end surfaces of the outer ring. Accordingly, even when the depth dimension of the step section is larger than the groove depth dimension, it is unlikely to decrease rigidity of the outer ring or exert an influence on the outer ring rolling surface.

Further, in the step section, in comparison with the case in which the groove section is processed by the cutting edge, the cutting resistance of the cutting edge can be minimized to a small level. Accordingly, the step section can be processed without reducing a lifespan of the cutting edge.

(7) A bearing according to an aspect of the present invention is a bearing having a plurality of rolling elements disposed between an inner ring and an outer ring that are disposed coaxially, wherein a groove section extending in a circumferential direction of an outer circumferential surface of the outer ring outside in a radial direction is formed in the outer circumferential surface, an enveloping layer formed of a plastic is formed on the outer circumferential surface, and a plurality of teeth for a gear are formed on an outer circumferential surface of the enveloping layer.

According to the aspect of (7), as the enveloping layer is formed of a plastic, a plurality of teeth for a gear can be formed on the coated outer circumferential surface of the enveloping layer. Accordingly, for example, the bearing may be used as a small planetary gear (a planetary gear) in a planetary gear mechanism.

(8) A drive module according to an aspect of the present invention includes a bearing of any one aspect of (1) to (7).

According to the aspect of (8), as the above-mentioned bearing is provided in the drive module, the drive module can be provided at a low cost while durability can be secured.

According to the aspects of the present invention, the bearing can be manufactured at a low cost in large quantities by forming the groove section on the outer circumferential surface of the outer ring and forming the enveloping layer of any one of rubber, a thermoplastic elastomer and a plastic on the outer circumferential surface.

DETAILED DESCRIPTION OF THE INVENTION

Hereinafter, embodiments according to the present invention will be described with reference to the accompanying drawings.

First Embodiment

Figure 1:
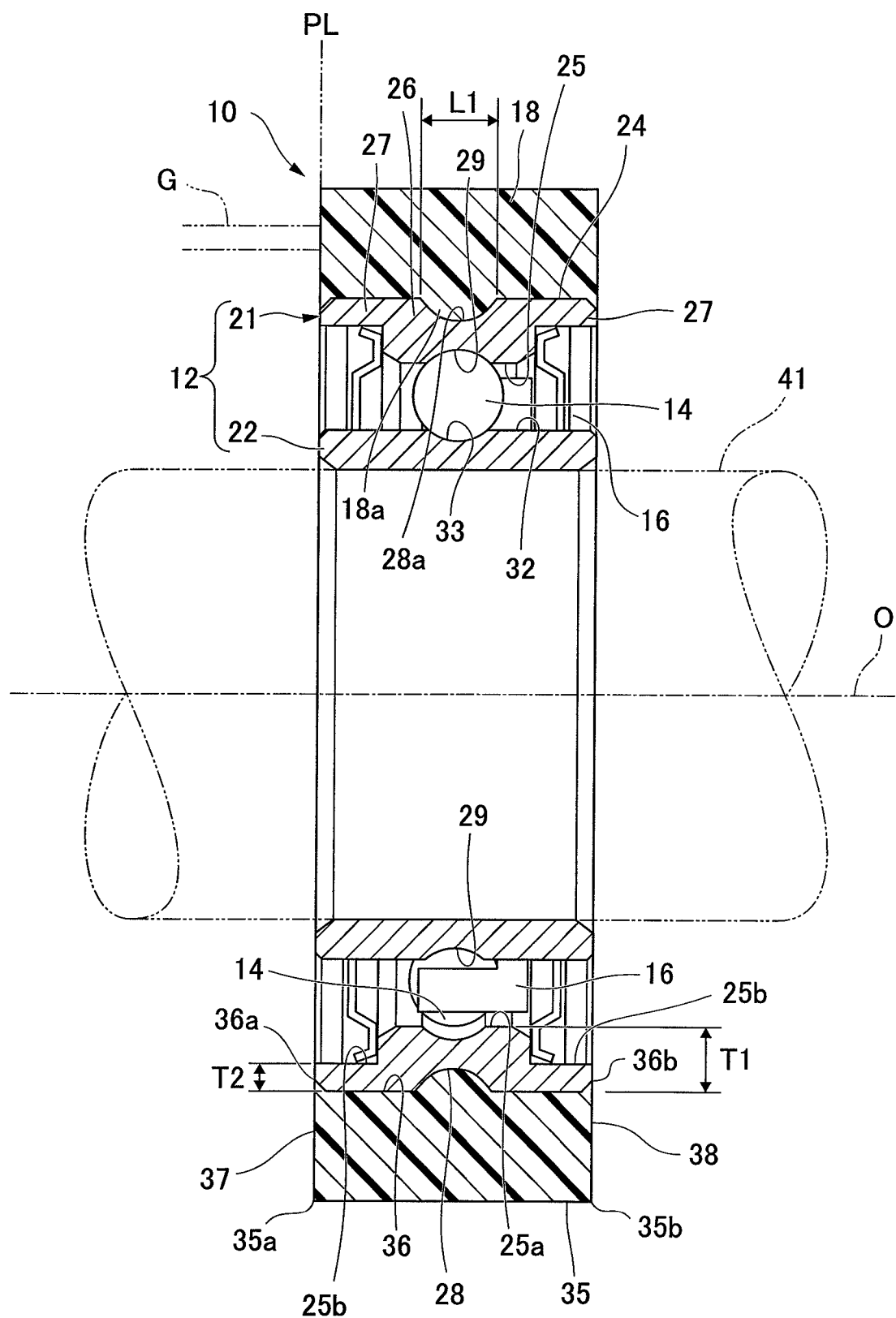
FIG. 1 is a cross-sectional view showing a bearing according to a first embodiment of the present invention.

FIG. 1 is a cross-sectional view of a bearing 10 according to a first embodiment.

As shown in FIG. 1, the bearing 10 is a rolling bearing including a ring body 12, a plurality of rolling elements 14, a retainer 16 and an enveloping layer 18.

The ring body 12 includes an outer ring 21 and an inner ring 22. The outer ring 21 and the inner ring 22 are disposed coaxially with an axis O of the bearing 10. The inner ring 22 is disposed inside the outer ring 21 in a radial direction.

The plurality of rolling elements 14 are annularly disposed between the outer ring 21 and the inner ring 22 that constitute the ring body 12. The retainer 16 holds the plurality of rolling elements 14 rollably in a state in which the rolling elements 14 are evenly arranged in a circumferential direction.

The outer ring 21 is formed of a metal material such as stainless or the like. The outer ring 21 is a cylindrical member, which is formed by, for example, forging, mechanical processing, or the like. The outer ring 21 has an outer circumferential surface 24, an inner circumferential surface 25, a central section 26 and a pair of outer side portions 27.

The outer circumferential surface 24 is annularly formed outside the outer ring 21 in the radial direction. The inner circumferential surface 25 is annularly formed inside the outer ring 21 in the radial direction. The central section 26 is formed at a center in the axis O direction. The central section 26 is formed such that an area 25a of the inner circumferential surface 25 at a center in an axis O direction is disposed inside from the outer circumferential surface 24 of the outer ring 21 in the radial direction at an interval T1. A groove section 28 extending in the circumferential direction is formed in an area of the outer circumferential surface 24 corresponding to the central section 26.

The groove section 28 has the deepest area 28a disposed further inside than the outer circumferential surface 24 in the radial direction. The deepest area 28a is the deepest area in the groove section 28. The groove section 28 is formed such that a groove width dimension L1 is gradually reduced from the outer circumferential surface 24 side toward the deepest area 28a in a cross-sectional shape.

As an example, the groove section 28 is formed such that a cross-sectional shape of the outer ring 21 at a center in the axis O direction is a curved surface and opens outside the outer ring 21 in the radial direction. The groove section 28 is formed in a shape that is symmetrical with respect to a center of the outer ring 21 in the axis O direction.

The pair of outer side portions 27 are formed symmetrically with respect to a center of the outer ring 21 in the axis O direction further outside the central section 26 in the axis O direction. The pair of outer side portions 27 are formed such that an area of the inner circumferential surface 25 outside in the axis O direction is disposed inside from the outer circumferential surface 24 of the outer ring 21 in the radial direction at an interval T2. The interval T1 of the central section 26 is set to be larger than the interval T2 of the pair of outer side portions 27. That is, a thickness dimension of the central section 26 is larger than a thickness dimension of the pair of outer side portions 27.

An outer ring rolling surface 29 is formed in the area 25a of the central section 26 in the inner circumferential surface 25. The outer ring rolling surface 29 is formed such that a cross section of a side surface is formed in an arc shape along outer surfaces of the rolling elements 14.

A radius of curvature in a cross section of the outer ring rolling surface 29 is set to be substantially the same as or slightly larger than a radius of curvature of the outer surfaces of the rolling elements 14. The outer ring rolling surface 29 is formed throughout the circumference of the inner circumferential surface 25 of the outer ring 21. The outer ring rolling surface 29 can abut the outer surfaces of the plurality of rolling elements 14.

The outer ring rolling surface 29 is formed at a center in the axis O direction and disposed at a position overlapping the groove section 28 in the radial direction of the outer circumferential surface 24.

The inner ring 22 is formed of a metal material such as stainless or the like. The inner ring 22 is a substantially cylindrical member having a predetermined thickness dimension in the axis O direction, and formed by, for example, forging, mechanical processing, or the like.

An inner ring rolling surface 33 is formed at an intermediate section of an outer circumferential surface 32 of the inner ring 22 in the axis O direction. The inner ring rolling surface 33 is formed such that a cross section of the side surface is formed in an arc shape along the outer surfaces of the rolling elements 14. A radius of curvature of the cross section of the inner ring rolling surface 33 is set to be substantially the same as or slightly larger than the radii of curvature of the outer surfaces of the rolling elements 14. The inner ring rolling surface 33 is formed throughout the circumference of the outer circumferential surface 32 of the inner ring 22. The inner ring rolling surface 33 can abut the outer surfaces of the plurality of rolling elements 14.

The rolling elements 14 are formed of a metal material such as stainless or the like or a ceramic material such as zirconia or the like in a spherical shape. The plurality of rolling elements 14 are disposed between the outer ring rolling surface 29 of the outer ring 21 and the inner ring rolling surface 33 of the inner ring 22 and roll along the outer ring rolling surface 29 and the inner ring rolling surface 33. The plurality of rolling elements 14 are evenly and annularly arranged by the retainer 16 to be rollable in the circumferential direction. Grease for lubrication is sealed on the bearing 10.

The enveloping layer 18 is formed of any one of rubber, a thermoplastic elastomer (TPE) and a hard plastic (plastic) on the outer circumferential surface 24 of the outer ring 21. The enveloping layer 18 has a coated outer circumferential surface 35, a coated inner circumferential surface 36, and a pair of coated side surfaces 37 and 38. Hereinafter, one coated side surface of the pair of coated side surfaces 37 and 38 is referred to as a first coated side surface 37, and the other coated side surface is referred to as a second coated side surface 38.

An interval between the first coated side surface 37 and the second coated side surface 38 is a widthwise dimension of the enveloping layer 18. The widthwise dimension of the enveloping layer 18 is set to be equal to the widthwise dimension of the ring body 12.

The coated inner circumferential surface 36 is welded to the outer circumferential surface 24 and the groove section 28 of the outer ring 21. The coated outer circumferential surface 35 is formed in an arc shape to have a predetermined thickness dimension with respect to the outer circumferential surface 24 of the outer ring 21. That is, the coated outer circumferential surface 35 is formed in a linear shape to be parallel to the axis O in the axis O direction of the bearing 10.

As the inner ring 22 is fixed to a support shaft 41, the enveloping layer 18 rotates with the outer ring 21. The coated outer circumferential surface 35 of the enveloping layer 18 is a surface configured to convey, for example, a bill, a ticket, or the like, or roll on a contact object 5 (see FIG. 4).

The first coated side surface 37 is a surface configured to connect one end 35a of the coated outer circumferential surface 35 and one end 36a of the coated inner circumferential surface 36 and formed to cross the axis O direction of the bearing 10. The second coated side surface 38 is a surface configured to connect the other end 35b of the coated outer circumferential surface 35 and the other end 36b of the coated inner circumferential surface 36 and formed to cross the axis O direction of the bearing 10.

Here, when the enveloping layer 18 is formed of a thermoplastic elastomer, the enveloping layer 18 is insert-molded on the outer circumferential surface 24 of the outer ring 21 through injecting molding. A mold is used to injection-mold the enveloping layer 18, and a gate G of the mold is disposed at a position corresponding to the first coated side surface 37 of the enveloping layer 18. As the inner side (a cavity) of the mold is filled with the melted thermoplastic elastomer from the gate G, the enveloping layer 18 is insert-molded on the outer circumferential surface 24 of the outer ring 21.

As the gate G of the mold is installed at the position corresponding to the first coated side surface 37, a filling place of the thermoplastic elastomer may be shifted from the coated outer circumferential surface 35.

In addition, a parting line PL of the mold is disposed on, for example, the first coated side surface 37 in the axis O direction of the bearing 10. The first coated side surface 37 is formed in a concave section in the one end 35a of the coated outer circumferential surface 35 with respect to the coated outer circumferential surface 35. The parting line PL is disposed at a position shifted from the coated outer circumferential surface 35.

In this way, as the gate G or the parting line PL is shifted from the coated outer circumferential surface 35, it is possible to prevent occurrence of burrs on the coated outer circumferential surface 35 generated when the inner side of the mold is filled with the thermoplastic elastomer from the gate G, burrs generated by the parting line PL, or the like.

Accordingly, it is possible to remove the necessity of post processing of removing burrs from the coated outer circumferential surface 35.

Incidentally, a mold temperature when the thermoplastic elastomer is injection-molded is decreased to a low level of 150° C. or less (preferably, 100° C. or less). In addition, when the inner side of the mold is filled with the melted thermoplastic elastomer from the gate G, the thermoplastic elastomer is solidified instantaneously. Accordingly, a high temperature of the melted thermoplastic elastomer cannot be transmitted to the grease sealed in the bearing 10. Accordingly, there is no concern of deterioration of the grease due to the high temperature of the melted thermoplastic elastomer.

The injection-molded thermoplastic elastomer is welded to the outer circumferential surface 24 or the groove section 28 of the outer ring 21. In this state, the groove section 28 is filled with the thermoplastic elastomer. That is, the groove section 28 of the outer circumferential surface 24 is filled with a protrusion 18a of the enveloping layer 18, and the groove section 28 of the outer circumferential surface 24 and the protrusion 18a of the enveloping layer 18 are engaged with each other in a concavo-convex shape. Accordingly, when a force is applied to the enveloping layer 18, the enveloping layer 18 cannot be removed from the outer ring 21 due to a concavo-convex structure between the outer circumferential surface 24 and the enveloping layer 18.

In addition, as the groove section 28 is filled with the thermoplastic elastomer, the filled thermoplastic elastomer plays a role of a so-called anchor. Accordingly, it is possible to prevent the enveloping layer 18 from dropping out of the outer circumferential surface 24 (i.e., the outer ring 21).

Styrenes (TPS), olefins (TPO), vinyl chlorides (PPVC), urethanes (TPU) or polyesters (TPEE) may be applied as the thermoplastic elastomer. In view of mechanical strength and wear resistance, urethanes (TPU), polyesters (TPEE) and styrenes (TPS) are preferable. More preferably, polyesters (TPEE) are exemplified as the thermoplastic elastomer.

While urethanes (TPU) have the most good wear resistance, a forming property is deteriorated, and sufficient drying is necessary due to high hygroscopicity. Further, annealing is also necessary, and forming accuracy is also degraded while manufacture thereof is time-consuming. In addition, among thermoplastic elastomers, urethanes have the best mechanical strength and wear resistance. For this reason, urethanes are used in the enveloping layer 18 when properties such as mechanical strength, wear resistance, or the like are necessary.

Among thermoplastic elastomers, aside from urethanes, polyesters (TPEE) are most good in wear resistance and mechanical strength, and also good in thermal adhesiveness to hard plastics or the like. Thermal bonding means, for example, that the thermoplastic elastomer of the enveloping layer 18 is melted by heating and attached to the outer circumferential surface 24 of the outer ring 21.

In addition, polyesters (TPEE) are optimal as a material for the enveloping layer 18 because hygroscopicity is also low and a forming property is also good.

In view of suppression of sound (noise), durometer hardness A (durometer hardness A) of the enveloping layer 18 is desirably 75 to 95. For example, as the durometer hardness A is 92, it is particularly preferable in view of the fact that the sound (noise) is appropriately suppressed and the mechanical strength or the wear resistance of the enveloping layer 18 is appropriately secured. When the durometer hardness A is less than 75, the mechanical strength or the wear resistance of the enveloping layer 18 is considered to become a problem.

Figure 2:
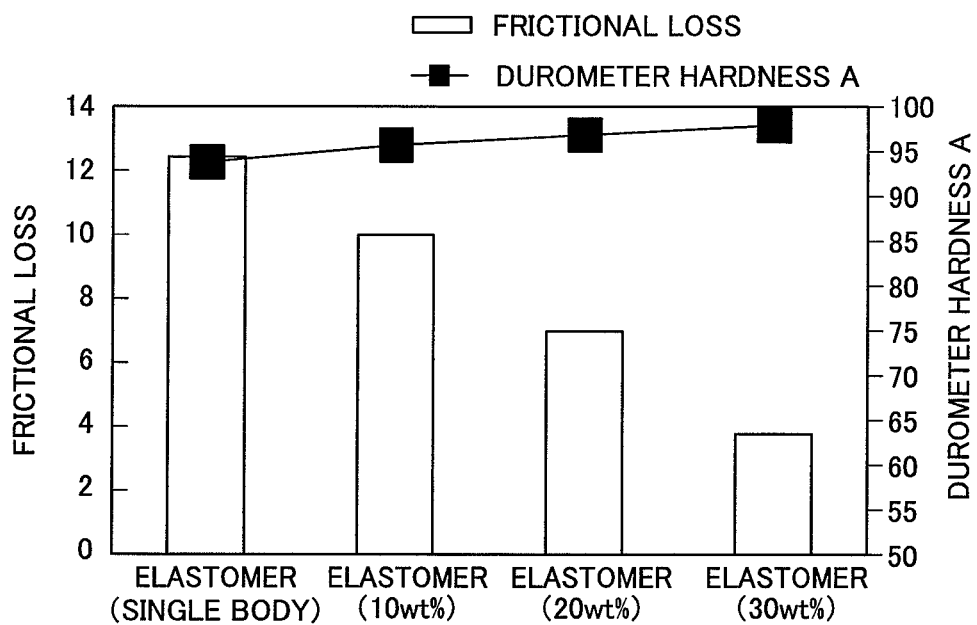
FIG. 2 is a graph showing a property of a state in which a potassium titanate fiber is contained in an enveloping layer according to the first embodiment of the present invention.

Here, for example, in order to secure abrasion loss of the enveloping layer 18, as shown in Table 1 and FIG. 2, the thermoplastic elastomer may contain a potassium titanate fiber.

Table 1 shows properties in a state in which the enveloping layer 18 of the present invention contains the potassium titanate fiber. FIG. 2 is a graph showing properties in a state in which the enveloping layer 18 contains the potassium titanate fiber.

In Table 1 and FIG. 2, a thermoplastic elastomer (polyesters (TPEE)) that does not contain the potassium titanate fiber is shown as an elastomer (a single body). The thermoplastic elastomer that contains the potassium titanate fiber at 10 wt % is shown as an elastomer (10 wt %).

In addition, the thermoplastic elastomer that contains the potassium titanate fiber at 20 wt % is shown as an elastomer (20 wt %). The thermoplastic elastomer that contains the potassium titanate fiber at 30 wt % is shown as an elastomer (30 wt %).

TABLE 1

|  |  | Elastomer (Single body) | Elastomer (10 wt %) | Elastomer (20 wt %) | Elastomer (30 wt %) |
|---|---|---|---|---|---|
| Tensile strength | Mpa | 12 | 13 | 18 | 23 |
| Bending strength | Mpa | 4 | 7 | 9 | 16 |
| Bending modulus of elasticity | Gpa | 0.05 | 0.13 | 0.21 | 0.44 |
| Izod notch | J/m | NB (Not broken) | NB (Not broken) | 158 | 208 |
| Durometer hardness A |  | 94 | 96 | 97 | 98 |
| Abrasion loss vs glass plate | $10^{-3}$ cm$^3$ | 12.5 | 10.1 | 7.0 | 3.8 |

In Table 1 and FIG. 2, properties of the elastomer (single body), the elastomer (10 wt %), the elastomer (20 wt %) and the elastomer (30 wt %) are shown.

When the thermoplastic elastomer contains the potassium titanate fibers of 10 wt %, 20 wt % and 30 wt %, the tensile strength can be increased from 12 Mpa to 13 Mpa, 18 Mpa and 23 Mpa.

In addition, the bending strength can be increased from 4 Mpa to 7 Mpa, 9 Mpa and 16 Mpa. Further, the bending modulus of elasticity can be increased from 0.05 GPa to 0.13 GPa, 0.21 GPa and 0.44 GPa.

In addition, the graph of FIG. 2 shows abrasion loss or durometer hardness A in a state in which the thermoplastic elastomer single body and thermoplastic elastomer contains the potassium titanate fibers at 10 wt %, 20 wt % and 30 wt %. As shown in FIG. 2 and Table 1, in a state in which the thermoplastic elastomer contains the potassium titanate fiber at 10 wt %, 20 wt % and 30 wt %, the durometer hardness A of the thermoplastic elastomer can also be substantially increased from 94 to 96, 97 and 98.

Further, as shown in FIG. 2 and Table 1, in a state in which the thermoplastic elastomer contains the potassium titanate fiber at 10 wt %, 20 wt % and 30 wt %, the abrasion loss of the thermoplastic elastomer can be reduced from $12.5 \times 10^{-3}$ cm$^3$ to $10.1 \times 10^{-3}$ cm$^3$, $7.0 \times 10^{-3}$ cm$^3$ and $3.8 \times 10^{-3}$ cm$^3$.

Here, the abrasion loss of the thermoplastic elastomer is measured by a reciprocal sliding test. In a reciprocal sliding test condition, a glass plate is selected as an opposite material, and a reciprocal sliding test is performed at a weight of 0.7 kg and a speed of 0.16 m/s for a time of 20 min.

Further, a content of the potassium titanate fiber is appropriately selected to correspond to a use of the bearing 10.

In addition, when the enveloping layer 18 is formed of rubber, injection molding is not employed. That is, when the enveloping layer 18 is formed of the rubber, an unvulcanized rubber should be heated and melted, and a pressure needs to be applied to the inner side of the mold set to a preliminary vulcanization (reaction) temperature (for example, in the case of the urethane rubber, about 160 to 200° C.) to be maintained for several hours to one day.

In this case, when the bearing 10 is set in the mold and insert-molded, a device configured to prevent deterioration of the grease sealed in the bearing 10 due to heat of a vulcanized (reaction) temperature is required, and a countermeasure such as a use of expensive urea grease having high thermal resistance is necessary.

The insert-molded rubber is welded to the outer circumferential surface 24 or the groove section 28 of the outer ring 21. In this state, the groove section 28 is filled with the rubber. That is, the groove section 28 of the outer circumferential surface 24 is filled with the protrusion 18a of the enveloping layer 18, and the groove section 28 of the outer circumferential surface 24 and the protrusion 18a of the enveloping layer 18 are engaged with each other in a concavo-convex shape. Accordingly, when a force is applied to the enveloping layer 18, the enveloping layer 18 cannot be removed from the outer ring 21 by the concavo-convex structure between the outer circumferential surface 24 and the enveloping layer 18.

In addition, as the groove section 28 of the outer circumferential surface 24 is filled with the rubber, the filled rubber functions as a so-called anchor. Accordingly, it is possible to prevent the enveloping layer 18 from dropping out of the outer circumferential surface 24 (i.e., the outer ring 21).

In this way, in the first embodiment, the groove section 28 of the outer circumferential surface 24 is filled with the enveloping layer 18 formed of any one of rubber, a thermoplastic elastomer and a plastic during insert molding, and the enveloping layer 18 is welded to the outer circumferential surface 24. Accordingly, a process in which the outer circumferential surface 24 of the outer ring 21 is processed to become rough through sandblast or a process of applying an adhesive agent on the outer circumferential surface 24 that has been processed to become rough may be unnecessary.

In addition, in the case of thermoplastic elastomer, as with urethane rubber, it is possible to eliminate a long curing process in the mold.

Accordingly, it is possible to manufacture the bearing 10 having the enveloping layer 18 formed on the outer circumferential surface 24 of the outer ring 21 at a low cost in large quantities.

In addition, as the enveloping layer 18 is welded to the outer circumferential surface 24, there is no need to bond the enveloping layer 18 to the outer circumferential surface 24 using an adhesive agent. The following effect is obtained when no adhesive agent is interposed between the enveloping layer 18 and the outer circumferential surface 24.

That is, the a case of a small bearing, for example, when an enveloping layer is bonded to an outer circumferential surface by an adhesive agent, the adhesive agent may not be applied on the outer circumferential surface with a uniform thickness dimension due to painting nonuniformity of the adhesive agent. Meanwhile, in the case of the small bearing, the thickness dimension of the enveloping layer is considered to be smaller than 1.0 mm. In this state, when the adhesive agent is not applied on the outer circumferential surface with a uniform thickness dimension, hardness of the enveloping layer is considered to become irregular.

For this reason, when a conveyance object is conveyed by a small bearing coated with an enveloping layer or when an enveloping layer rolls along a contact object, sound (noise) causing torque nonuniformity may occur.

On the other hand, as the enveloping layer 18 is welded to the outer circumferential surface 24, the adhesive agent may be unnecessary. Accordingly, even when the bearing 10 is small and the thickness dimension of the enveloping layer 18 is smaller than 1.0 mm, hardness of the enveloping layer 18 can be evenly maintained throughout the circumference.

Figure 4:
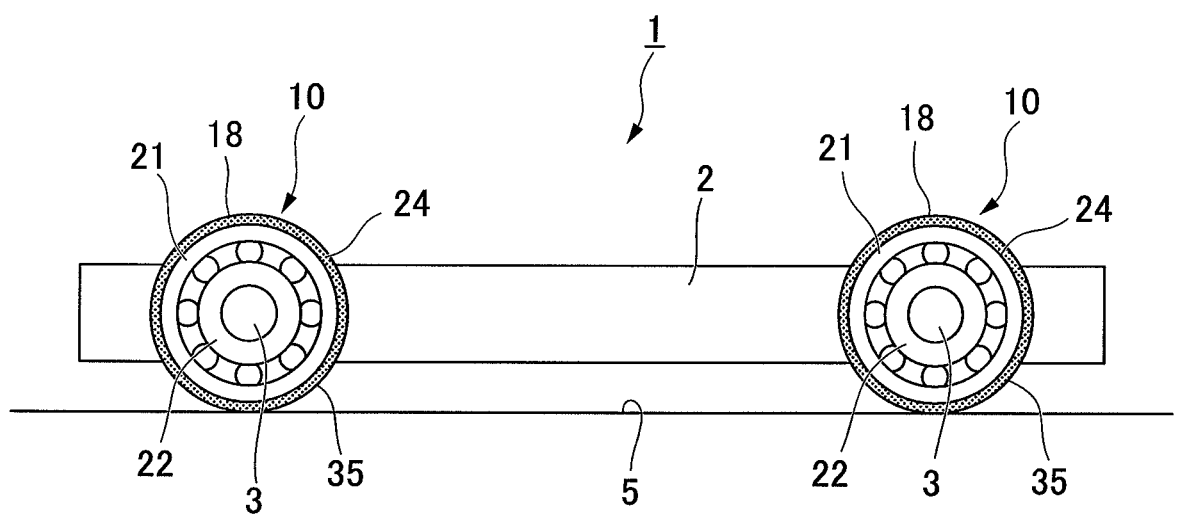
FIG. 4 is a side view showing a moving body including the bearing according to the first embodiment of the present invention.

Accordingly, even when the bearing 10 is formed in a compact size, generation of sound (noise) or causing of torque nonuniformity can be minimized when a conveyance object is conveyed by the bearing 10 or the bearing 10 is rolled along the contact object 5 (see FIG. 4).

Further, while the example in which the enveloping layer 18 is formed on the outer circumferential surface 24 only by welding has been described in the first embodiment, the enveloping layer 18 may be formed on the outer circumferential surface 24 using, for example, an adhesive agent in combination with welding according to a use of the bearing 10.

Incidentally, the groove section 28 is formed at a center in the axis O direction, and disposed at a position overlapping the outer ring rolling surface 29 and the outer circumferential surface 24 in the radial direction. Meanwhile, the groove section 28 has a cross sectional shape formed in a curved surface shape. Accordingly, an influence of deformation of the outer ring 21 or a decrease in rigidity of the outer ring 21 due to the groove section 28 on the outer ring rolling surface 29 can be minimized.

Further, as the cross-sectional shape of the groove section 28 is the curved surface shape, a bottom surface of the groove section 28 has no flat section. Accordingly, when the groove section 28 is processed using a cutting edge, a cutting resistance of the cutting edge can be minimized to a small level, and processing of the groove section 28 becomes easy. Further, a lifespan of the cutting edge can be extended by minimizing the cutting resistance of the cutting edge to a small level.

In addition, the groove section 28 is formed in a symmetrical shape with respect to a center of the outer ring 21 in the axis O direction. The groove section 28 is formed at a center of the outer circumferential surface 24 of the outer ring 21 with good balance. Accordingly, an influence of deformation of the outer ring 21 of a decrease in rigidity of the outer ring 21 due to the groove section 28 on the outer ring rolling surface 29 can be more appropriately minimized.

Here, the groove section 28 is formed at a center of the outer ring 21 in the axis O direction, and the outer ring rolling surface 29 is also formed at a center of the outer ring 21 in the axis O direction. Accordingly, an influence of the deformation due to heat treatment such as quenching or the like of the outer ring 21 can be minimized to a small level. In particular, the outer ring 21 is formed such that a thickness dimension of the central section 26 is larger than a thickness dimension of the pair of outer side portions 27. The groove section 28 is formed in an area of the central section 26 in which the thickness dimension is large. Accordingly, the thickness dimension in which the groove section 28 is formed can be secured.

Further, the groove section 28 has a cross-sectional shape that is a curved surface shape. Meanwhile, the outer ring rolling surface 29 also has a cross-sectional shape that is a curved surface shape. That is, the groove section 28 is formed in the shape of the outer ring rolling surface 29. Accordingly, an influence of the deformation due to heat treatment such as quenching or the like of the outer ring 21 can be minimized to a smaller level.

(Variant)

Next, a variant of the bearing 10 of the first embodiment will be described.

Figure 3:
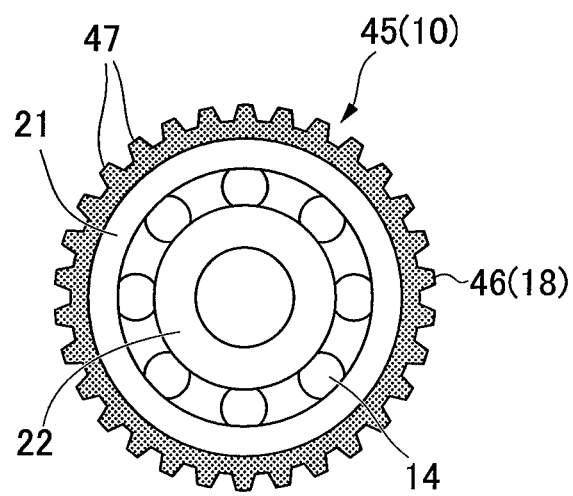
FIG. 3 is a side view showing a variant of the bearing according to the first embodiment of the present invention.

FIG. 3 is a side view showing the variant of the bearing according to the first embodiment.

While the example in which the enveloping layer 18 is formed of rubber or a thermoplastic elastomer has been described as the bearing 10 of the first embodiment, the enveloping layer 18 may be formed of a hard plastic as another example. For example, polyacetal, Nylon, or the like may be exemplified as the hard plastic.

When the enveloping layer 18 is formed of a hard plastic, a pulley or a gear can be formed on the coated outer circumferential surface 35 of the enveloping layer 18.

As shown in FIG. 3, an enveloping layer 46 is formed of a hard plastic, and a plurality of teeth 47 for a gear are formed on a coated outer circumferential surface of the enveloping layer 46. Accordingly, the bearing 10 can be used as a gear 45. The gear 45 can be used as, for example, a small planetary gear (planetary gear) in a planetary gear mechanism.

In addition, when the enveloping layer 18 is formed of a hard plastic and formed on the pulley, for example, the bearing 10 may be used as a wheel of a screen door.

Next, an example of a use of the bearing 10 of the first embodiment will be described with reference to FIG. 4. FIG. 4 is a side view showing a moving body 1 including the bearing 10 according to the first embodiment.

As shown in FIG. 4, for example, the bearing 10 is attached to a moving body (a drive module) 1 and used as a wheel.

The moving body 1 includes a main body section 2, and the plurality of bearings 10 attached to both sides of the main body section 2. The plurality of bearings 10 are fixed when the inner ring 22 is attached to a support shaft 3.

The support shaft 3 is attached to the main body section 2. As the inner ring 22 is fixed to the support shaft 3, the outer ring 21 and the enveloping layer 18 are rotatably supported by the support shaft 3. That is, the plurality of bearings 10 are used as wheels.

The moving body 1 is disposed in a state in which the enveloping layer 18 (specifically, the coated outer circumferential surface 35) of the plurality of bearings 10 is in contact with the contact object 5. As the outer ring 21 and the enveloping layer 18 of the bearing 10 roll on the contact object 5, the moving body 1 can move along the contact object 5.

Since the enveloping layer 18 is formed on the outer ring 21, when the bearing 10 moves while rolling on the contact object 5, sound (noise) can be reduced by the enveloping layer 18. In addition, since the enveloping layer 18 is strongly engaged with the outer circumferential surface 24 of the outer ring 21 in a concavo-convex shape, separation of the enveloping layer 18 from the outer circumferential surface 24 of the outer ring 21 can be prevented.

In this way, as the plurality of bearings 10 are provided in the moving body 1, the moving body 1 can be obtained at a low cost while durability can be secured.

While the example in which the enveloping layer 18 of the bearing 10 is rotated while in contact with the contact object 5 and the moving body 1 is moved along the contact object 5 has been described in FIG. 4, there is no limitation thereto. As another example, the moving body 1 may be maintained in a fixed state, and the contact object 5 may also be moved according to rotation of the enveloping layer 18 by bringing the enveloping layer 18 in contact with the contact object 5.

In this case, a case in which a drawer in a desk is the contact object 5 corresponds to the other example.

In addition, as another example, the bearing 10 may be applied to a wheel chair in which a traveling direction is turned. As the bearing 10 is applied to the wheel chair, the bearing 10 can be turned to correspond to the traveling direction of the moving body 1.

Further, as an example of another use, the bearing 10 is used in a conveyance apparatus (a drive module) for a bill, a ticket, or the like. That is, in the conveyance apparatus, the inner rings 22 of the pair of bearings 10 are attached to the support shaft 3, and the outer ring 21 and the enveloping layer 18 are rotatably supported by the support shaft. The pair of enveloping layers 18 are disposed adjacent to each other. In this state, as the outer ring 21 and the enveloping layer 18 are rotated, a bill, a ticket, or the like is sandwiched and conveyed between the pair of enveloping layers 18.

Since the enveloping layer 18 is formed on the outer ring 21, when a bill, a ticket, or the like is conveyed while sandwiched between the enveloping layers 18 of the bearings 10, sound (noise) can be reduced by the enveloping layers 18. In addition, since the enveloping layer 18 is strongly engaged with the outer circumferential surface 24 of the outer ring 21 in a concavo-convex shape, separation of the enveloping layer 18 from the outer circumferential surface 24 of the outer ring 21 can be prevented.

In this way, as the bearings 10 are provided in the conveyance apparatus, the conveyance apparatus can be obtained at a low cost while durability can be secured.

Next, bearings of a second embodiment to a seventh embodiment will be described with reference to FIG. 5 to FIG. 10. Further, in the bearings of the second embodiment to the seventh embodiment, the same members as and similar members to those of the bearing 10 of the first embodiment are designated by the same reference numerals and detailed description thereof will be omitted.

Second Embodiment

Figure 5:
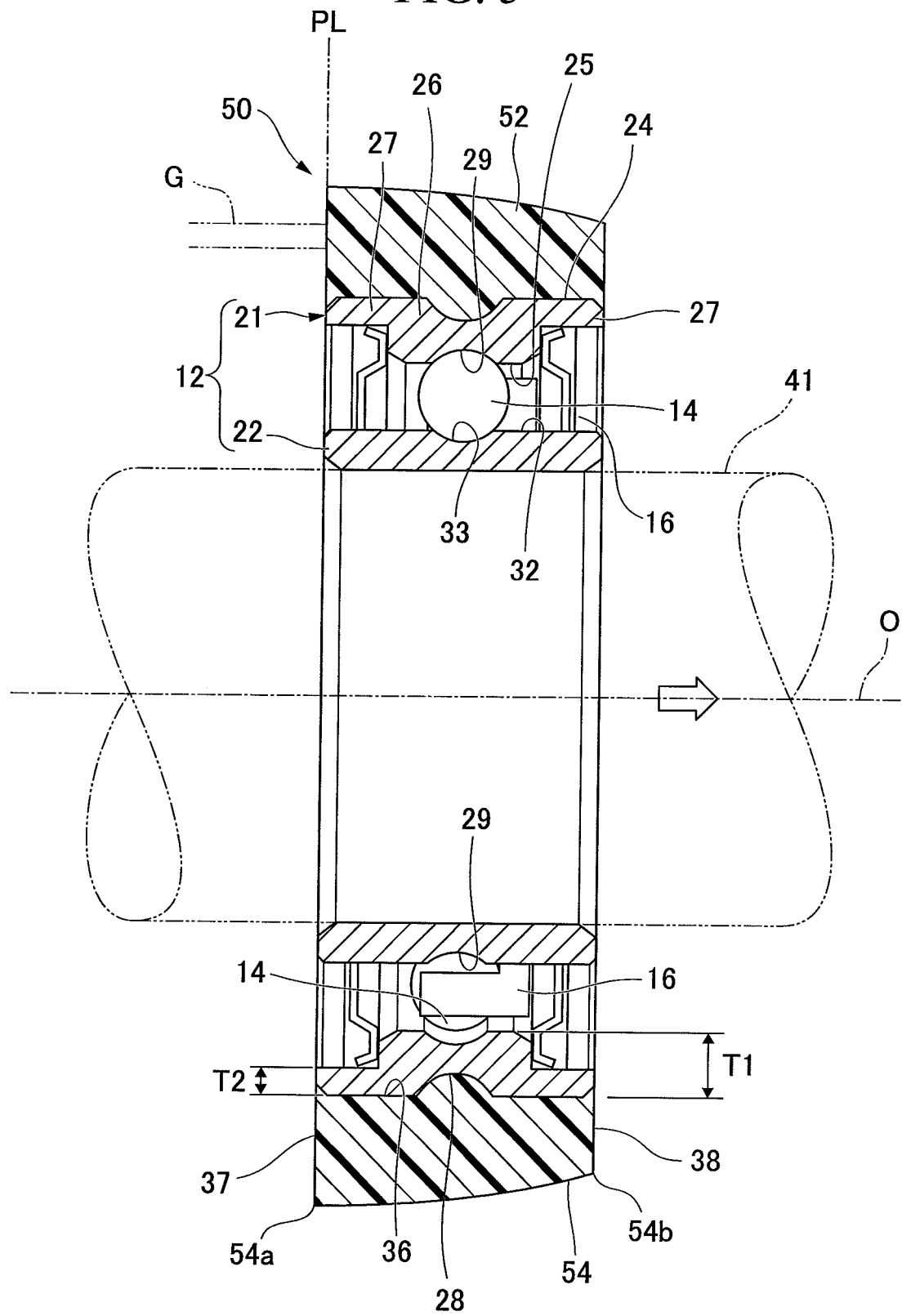
FIG. 5 is a cross-sectional view showing a bearing according to a second embodiment of the present invention.

FIG. 5 is a cross-sectional view of a bearing 50 according to the second embodiment.

As shown in FIG. 5, the bearing 50 is obtained by replacing the enveloping layer 18 of the first embodiment with an enveloping layer 52, and other configurations are the same as those of the bearing 10 of the first embodiment. In the enveloping layer 52, the coated outer circumferential surface 35 of the first embodiment is replaced with a coated outer circumferential surface 54.

The coated outer circumferential surface 54 has a first end portion 54a and a second end portion 54b. The first end portion 54a is an end portion at which the first coated side surface 37 and the coated outer circumferential surface 54 cross each other. The second end portion 54b is an end portion at which the second coated side surface 38 and the coated outer circumferential surface 54 cross each other. The coated outer circumferential surface 54 is formed in a curved shape such that an outer diameter gradually decreases from the first end portion 54a to the second end portion 54b. The coated outer circumferential surface 54 may be formed in a linear shape such that the outer diameter gradually decreases.

The parting line PL of the mold is disposed on the first end portion 54a. That is, the coated outer circumferential surface 54 is formed in a curved shape such that an outer diameter gradually decreases from the parting line PL to the second end portion 54b. Accordingly, after the enveloping layer 52 is insert-molded, as a movable die of the mold is opened in an arrow direction, generation of burrs on the coated outer circumferential surface 54 can be minimized.

Accordingly, after the enveloping layer 52 is insert-molded on the outer circumferential surface 24 of the outer ring 21, post-processing of removing the burrs from the coated outer circumferential surface 54 is unnecessary.

The outer diameter of the coated outer circumferential surface 54 is formed to gradually decrease. Accordingly, when a bill, a ticket, or the like is conveyed by the coated outer circumferential surface 54 or when the coated outer circumferential surface 54 moves while rolling on the contact object 5 (see FIG. 4), a contact area with the bill, the ticket, the contact object 5, or the like can be minimized to a small level. Accordingly, when the bill, the ticket, or the like is conveyed by the coated outer circumferential surface 54 or the coated outer circumferential surface 54 moves while rolling on the contact object 5, an effect of decreasing sound (noise) is obtained.

While the example in which the parting line PL is disposed on the first end portion 54a has been exemplarily described in the second embodiment, there is no limitation thereto. As another example, for example, a step section may be formed in the middle of the coated outer circumferential surface 54 in the axis O direction, and the outer diameter may be formed to gradually decrease from the step section to the second end portion 54b and may be formed to be parallel to the axis O from the step section to the first end portion 54a.

In addition, according to the bearing 50 of the second embodiment, like the bearing 10 of the first embodiment, the bearing 50 having the enveloping layer 52 formed on the outer circumferential surface 24 of the outer ring 21 can be manufactured at a low cost in large quantities. Further, separation of the enveloping layer 52 from the outer circumferential surface 24 (i.e., the outer ring 21) can be prevented.

In addition, as the enveloping layer 52 is welded to the outer circumferential surface 24, the enveloping layer 52 need not be adhered to the outer circumferential surface 24 by an adhesive agent. Accordingly, even when the thickness dimension of the enveloping layer 52 is less than 1.0 mm, hardness of the enveloping layer 52 can be evenly maintained throughout the circumference. Accordingly, even when the bearing 50 is formed in a compact shape, generation of sound (noise) or causing of torque nonuniformity can be minimized when the conveyance object is conveyed by the bearing 50 or the bearing 50 rolls along the contact object 5 (see FIG. 4).

Third Embodiment

Figure 6:
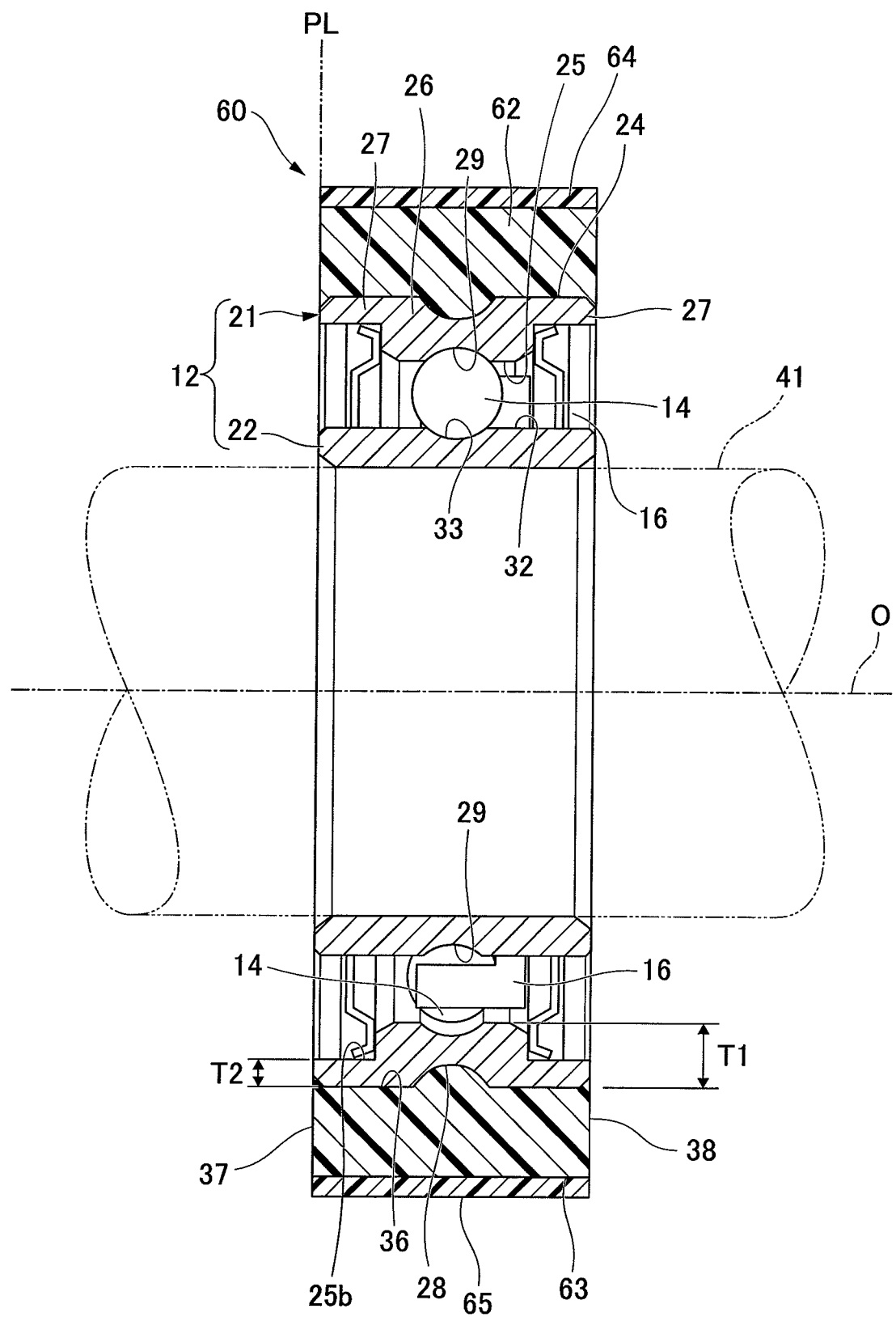
FIG. 6 is a cross-sectional view showing a bearing according to a third embodiment of the present invention.

FIG. 6 is a cross-sectional view of a bearing 60 according to a third embodiment.

As shown in FIG. 6, the bearing 60 is obtained by replacing the enveloping layer 18 of the first embodiment with a first enveloping layer 62 and a second enveloping layer 64, and other configurations are the same as those of the bearing 10 of the first embodiment.

Like the enveloping layer 18 of the first embodiment, the first enveloping layer 62 is formed of any one of rubber, a thermoplastic elastomer and a plastic. The first enveloping layer 62 has a first coated outer circumferential surface 63.

Like the coated outer circumferential surface 35 of the first embodiment, the first coated outer circumferential surface 63 is formed to be parallel to the axis O of the bearing 60 in the axis O direction.

The first coated outer circumferential surface 63 is integrally coated with the second enveloping layer 64 by, for example, affixing, coating, two color formation, or the like. The second enveloping layer 64 is formed in a substantially cylindrical shape with a predetermined thickness dimension in the axis O direction. The second enveloping layer 64 is a member having a larger bending modulus of elasticity or hardness than the first enveloping layer 62.

Accordingly, when a bill, a ticket, or the like is conveyed by a second coated outer circumferential surface 65 of the second enveloping layer 64 or the second coated outer circumferential surface 65 moves while rolling on the contact object 5 (see FIG. 4), a decrease in sound (noise) can be achieved, and further, wear resistance and durability of the second coated outer circumferential surface 65 can be secured.

In addition, according to the bearing 60 of the third embodiment, like the bearing 10 of the first embodiment, the bearing 60 having the first enveloping layer 62 and the second enveloping layer 64 formed on the outer circumferential surface 24 of the outer ring 21 can be manufactured at a low cost in large quantities. Further, separation of the first enveloping layer 62 and the second enveloping layer 64 from the outer circumferential surface 24 (i.e., the outer ring 21) can be prevented.

In addition, as the first enveloping layer 62 is welded to the outer circumferential surface 24, the first enveloping layer 62 need not be adhered to the outer circumferential surface 24 by an adhesive agent. Accordingly, even when the thickness dimension of the first enveloping layer 62 is less than 1.0 mm, hardness of the first enveloping layer 62 can be evenly maintained throughout the circumference. Accordingly, even when the bearing 60 is formed in a compact shape, generation of sound (noise) or causing of torque nonuniformity can be minimized when the conveyance object is conveyed by the bearing 60 or when the bearing 60 rolls along the contact object 5 (see FIG. 4).

Fourth Embodiment

Figure 7:
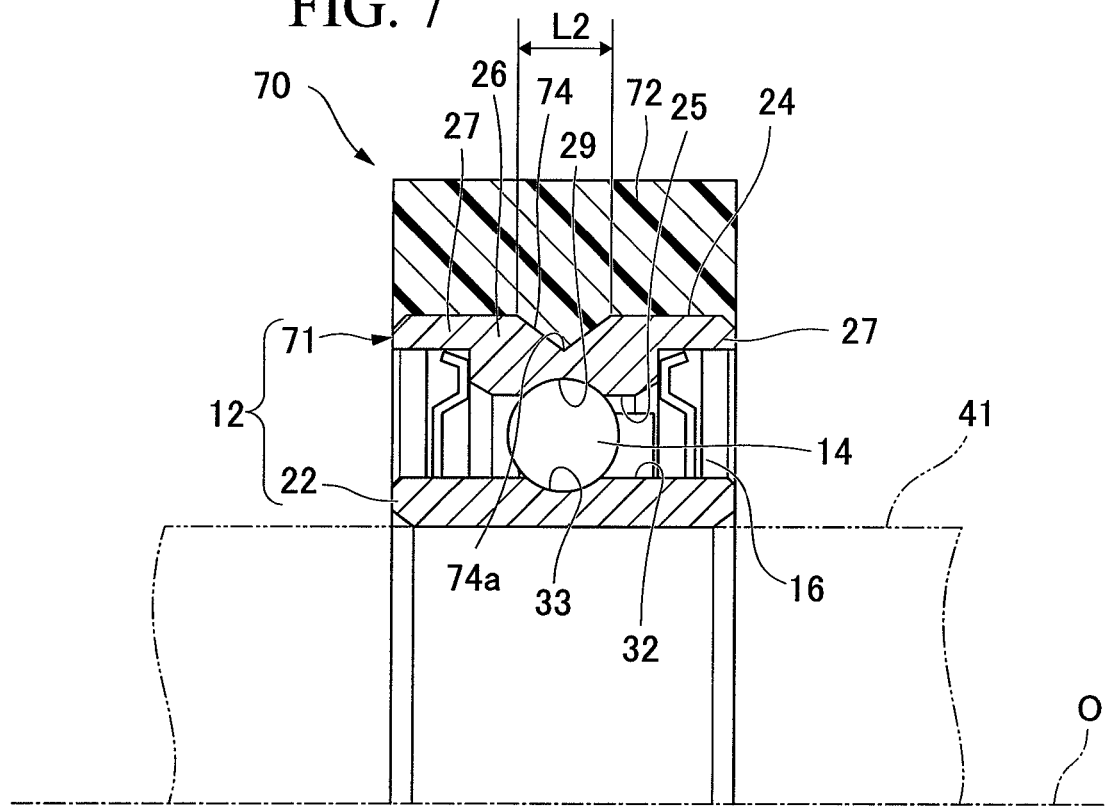
FIG. 7 is a cross-sectional view showing a bearing according to a fourth embodiment of the present invention.

FIG. 7 is a cross-sectional view of a bearing 70 according to a fourth embodiment.

As shown in FIG. 7, the bearing 70 is obtained by replacing the outer ring 21 and the enveloping layer 18 of the first embodiment with an outer ring 71 and an enveloping layer 72, and other configurations are the same as those of the bearing 10 of the first embodiment.

The outer ring 71 is obtained by replacing the groove section 28 of the outer circumferential surface 24 of the first embodiment with a groove section 74, and other configurations are the same as those of the outer ring 21 of the first embodiment.

The groove section 74 has a deepest area 74a further inside than the outer circumferential surface 24 in the radial direction. The deepest area 74a is the deepest area in the groove section 74. The groove section 74 is formed such that a groove width dimension L2 gradually decreases from the outer circumferential surface 24 side to the deepest area 74a in a cross-sectional shape.

As an example, the groove section 74 is formed in a V shape in a cross section at a center of the outer ring 71 in the axis O direction, and opened outside the outer ring 71 in the radial direction. The groove section 74 is formed in a symmetrical shape with respect to a center of the outer ring 71 in the axis O direction.

The groove section 74 of the outer circumferential surface 24 is filled with the enveloping layer 72 formed any one of rubber, a thermoplastic elastomer and a plastic during insert molding, and the enveloping layer 72 is welded to the outer circumferential surface 24 of the outer ring 71. Accordingly, a process in which the outer circumferential surface 24 of the outer ring 71 is processed to become rough through sandblast or a process of applying an adhesive agent to the outer circumferential surface 24 that has been processed to become rough may be unnecessary.

In addition, when the enveloping layer 72 is insert-molded of a thermoplastic elastomer, as with urethane rubber, it is possible to eliminate a long curing process in the mold.

Accordingly, the bearing 70 having the enveloping layer 72 formed on the outer circumferential surface 24 of the outer ring 71 can be manufactured at a low cost in large quantities. Further, separation of the enveloping layer 72 from the outer circumferential surface 24 (i.e., the outer ring 71) can be prevented.

In addition, as the enveloping layer 72 is welded to the outer circumferential surface 24, adhesion of the enveloping layer 72 to the outer circumferential surface 24 by an adhesive agent is unnecessary. Accordingly, even when the thickness dimension of the enveloping layer 72 is smaller than 1.0 mm, hardness of the enveloping layer 72 can be evenly maintained throughout the circumference. Accordingly, even when the bearing 70 is formed in a compact shape, generation of sound (noise) or causing of torque nonuniformity can be minimized when the conveyance object is conveyed by the bearing 70 or when the bearing 70 rolls along the contact object 5 (see FIG. 4).

In addition, the groove section 74 has a cross-sectional shape that is a V-shaped surface. In addition, the groove section 74 has a symmetrical shape with respect to a center of the outer ring 71 in the axis O direction. Accordingly, the groove section 74 is formed at a center of the outer circumferential surface 24 of the outer ring 71 with good balance. Accordingly, an influence of deformation of the outer ring 71 or a decrease in rigidity of the outer ring 71 due to the groove section 74 on the outer ring rolling surface 29 can be minimized. Further, as a cross-sectional shape of the groove section 74 is a V-shaped surface, the bottom surface of the groove section 74 may have no flat section. Accordingly, a cutting resistance of the cutting edge that processes the groove section 74 can be minimized to a small level, and processing of the groove section 74 becomes easy. Further, a lift time of the cutting edge can be extended by minimizing the cutting resistance of the cutting edge to a small level.

Here, the groove section 74 is formed at a center of the outer ring 71 in the axis O direction, and the outer ring rolling surface 29 is also formed at a center of the outer ring 71 in the axis O direction. Accordingly, an influence of the deformation due to heat treatment such as quenching or the like of the outer ring 71 can be minimized to a small level. In particular, the outer ring 71 is formed such that the thickness dimension of the central section 26 is larger than the thickness dimension of the pair of outer side portions 27. The groove section 74 is formed in an area of the central section 26 having a large thickness dimension. Accordingly, the thickness dimension in which the groove section 74 is formed can be secured.

Fifth Embodiment

Figure 8:
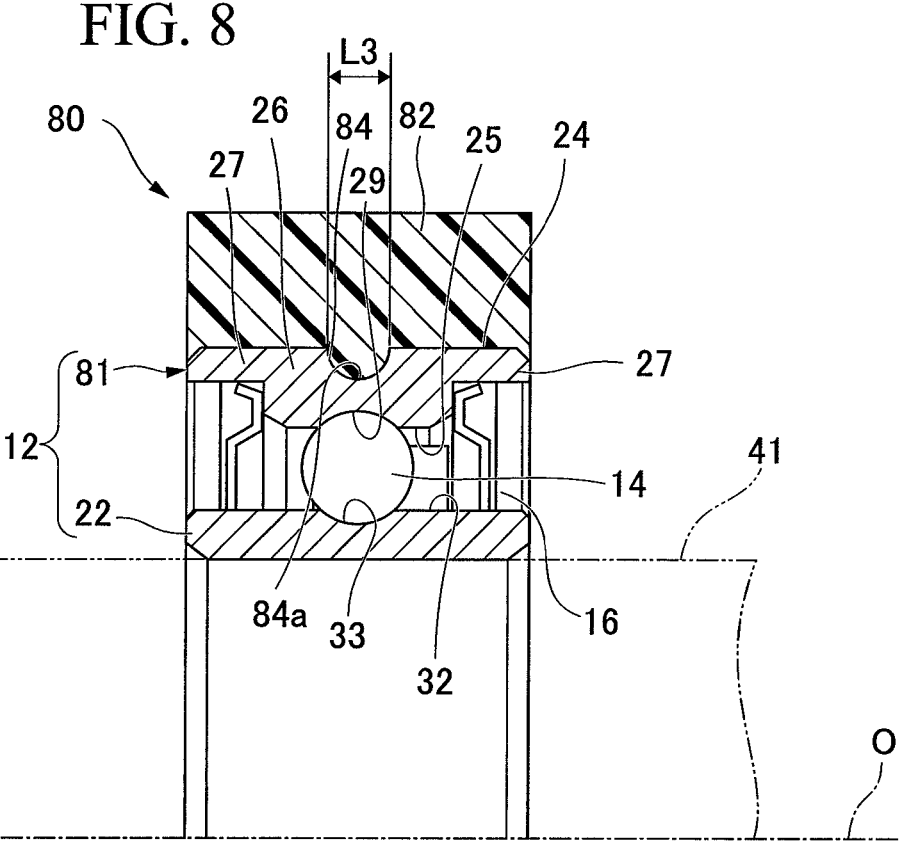
FIG. 8 is a cross-sectional view showing a bearing according to a fifth embodiment of the present invention.

FIG. 8 is a cross-sectional view of a bearing 80 according to a fifth embodiment.

As shown in FIG. 8, the bearing 80 is obtained by replacing the outer ring 21 and the enveloping layer 18 of the first embodiment with an outer ring 81 and an enveloping layer 82, and other configurations are the same as those of the bearing 10 of the first embodiment.

The outer ring 81 is obtained by replacing the groove section 28 of the outer circumferential surface 24 of the first embodiment with a groove section 84.

The groove section 84 has a deepest area 84a further inside than the outer circumferential surface 24 in the radial direction. The deepest area 84a is the deepest area in the groove section 84. The groove section 84 is formed such that a groove width dimension L3 gradually decreases from the outer circumferential surface 24 side to the deepest area 84a in a cross-sectional shape.

As an example, the groove section 84 is formed in a U-shaped cross section at a center of the outer ring 81 in the axis O direction and opened outside the outer ring 81 in the radial direction. The groove section 84 has a symmetrical shape with respect to a center of the outer ring 81 in the axis O direction.

The groove section 84 of the outer circumferential surface 24 is filled with the enveloping layer 82 formed of any one of rubber, a thermoplastic elastomer and a plastic during insert molding, and the enveloping layer 82 is welded to the outer circumferential surface 24. Accordingly, a process in which the outer circumferential surface 24 of the outer ring 81 is processed to become rough through sandblast or a process of applying an adhesive agent to the outer circumferential surface 24 that has been processed to become rough may be unnecessary.

In addition, in the case of a thermoplastic elastomer, as with urethane rubber, it is possible to eliminate a long curing process in the mold.

Accordingly, the bearing 80 having the enveloping layer 82 formed on the outer circumferential surface 24 of the outer ring 81 can be manufactured at a low cost in large quantities. Further, separation of the enveloping layer 82 from the outer circumferential surface 24 (i.e., the outer ring 81) can be prevented.

In addition, as the enveloping layer 82 is welded to the outer circumferential surface 24, the enveloping layer 82 need not be adhered to the outer circumferential surface 24 by an adhesive agent. Accordingly, even when the thickness dimension of the enveloping layer 82 is less than 1.0 mm, hardness of the enveloping layer 82 can be evenly maintained throughout the circumference. Accordingly, even when the bearing 80 is formed in a compact shape, generation of sound (noise) or causing of torque nonuniformity can be minimized when the conveyance object is conveyed by the bearing 80 and when the bearing 80 rolls along the contact object 5 (see FIG. 4).

In addition, the groove section 84 is formed in a U-shaped cross section. Further, the groove section 84 has a symmetrical shape with respect to a center of the outer ring 81 in the axis O direction. Accordingly, the groove section 84 is formed at a center of the outer circumferential surface 24 of the outer ring 81 with good balance. Accordingly, an influence of deformation of the outer ring 81 or a decrease in rigidity of the outer ring 81 due to the groove section 84 on the outer ring rolling surface 29 can be minimized. In addition, as the groove section 84 has a cross-sectional shape that is a U-shaped surface, the bottom surface of the groove section 84 may have no flat section. Accordingly, cutting resistance of the cutting edge that processes the groove section 84 can be minimized to a small level, and processing of the groove section 84 becomes easy. Further, a lifespan of the cutting edge can be extended by minimizing the cutting resistance of the cutting edge to a small level.

Here, the groove section 84 is formed at a center of the outer ring 81 in the axis O direction, and the outer ring rolling surface 29 is also formed at a center of the outer ring 81 in the axis O direction. Accordingly, an influence of the deformation due to heat treatment such as quenching or the like of the outer ring 81 can be minimized to a small level. In particular, the outer ring 81 is formed such that the thickness dimension of the central section 26 is larger than the thickness dimension of the pair of outer side portions 27. The groove section 84 is formed in an area of the central section 26 having a large thickness dimension. Accordingly, the thickness dimension in which the groove section 84 is formed can be secured.

Sixth Embodiment

Figure 9:
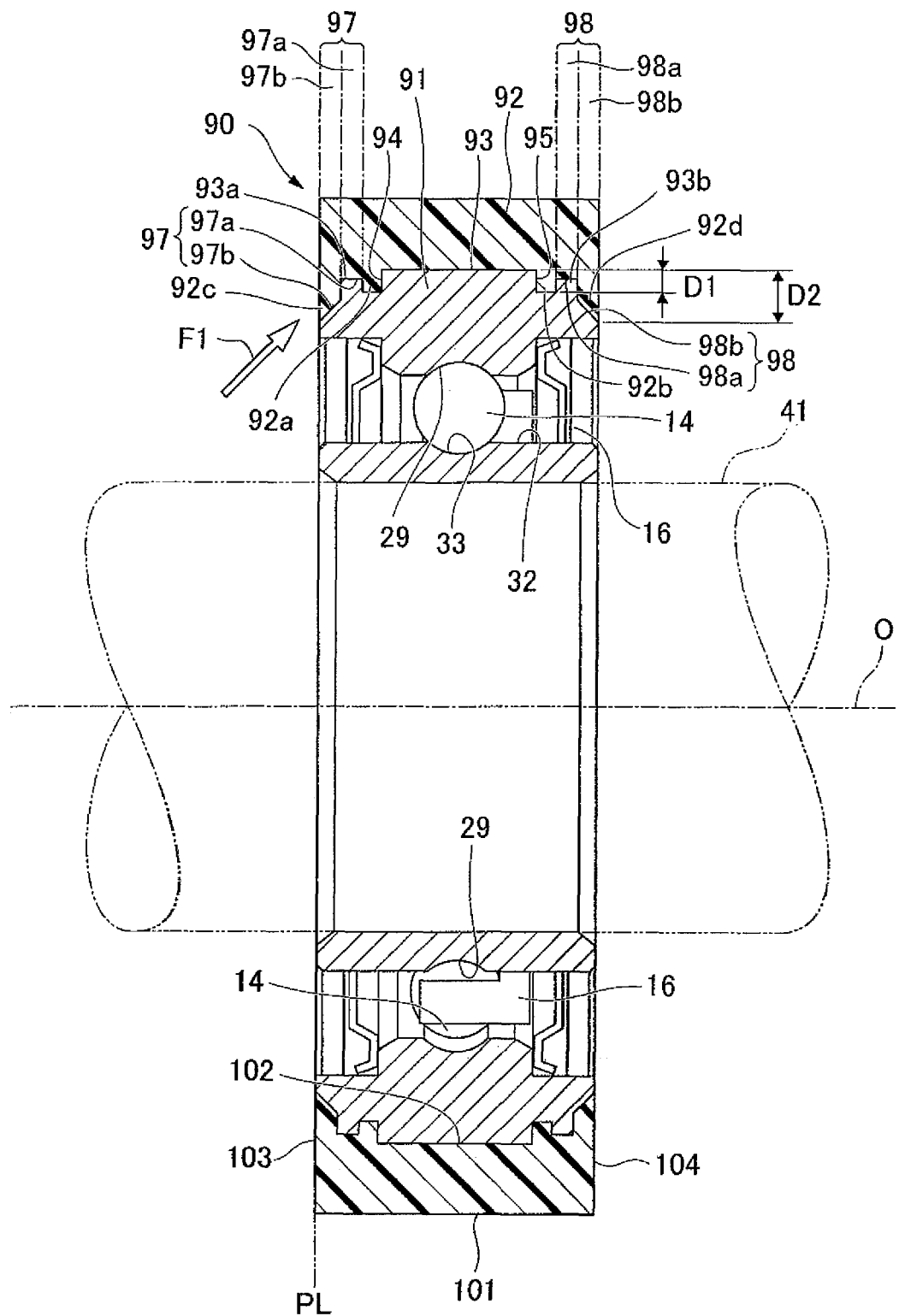
FIG. 9 is a cross-sectional view showing a bearing according to a sixth embodiment of the present invention.

FIG. 9 is a cross-sectional view of a bearing 90 according to a sixth embodiment.

As shown in FIG. 9, the bearing 90 is obtained by replacing the outer ring 21 and the enveloping layer 18 of the first embodiment with an outer ring 91 and an enveloping layer 92, and other configurations are the same as those of the bearing 10 of the first embodiment.

The outer ring 91 has a groove section comprised of a plurality of groove sections 94 and 95 and a plurality of step sections 97 and 98. The plurality of groove sections 94 and 95 are constituted by a first groove section 94 and a second groove section 95 formed at both sides of a center of an outer circumferential surface 93 of the outer ring 91 in the axis O direction. The first groove section 94 and the second groove section 95 are symmetrically formed with respect to a center of the outer ring 91 in the axis O direction at an interval in the axis O direction.

Accordingly, the first groove section 94 and the second groove section 95 are disposed to be separated from the outer ring rolling surface 29 in the axis O direction of the outer ring 91.

The first groove section 94 and the second groove section 95 have cross-sectional shapes that are, for example, U-shaped surfaces (rectangular surfaces), and a groove depth dimension is formed as D1. A cross-sectional shape of the first groove section 94 and the second groove section 95 may also be a curved surface, a V-shaped surface or a U-shaped surface. Further, in addition to the first groove section 94 and the second groove section 95, like the first embodiment to the fifth embodiment, the groove section may be formed at a center of the outer ring 91 in the axis O direction.

The plurality of step sections 97 and 98 are constituted by a first step section 97 and a second step section 98 formed on both end surfaces 93a and 93b of the outer circumferential surface 93 of the outer ring 91 in the axis O direction. The first step section 97 and the second step section 98 are symmetrically formed with respect to a center of the outer ring 91 in the axis O direction at an interval in the axis O direction.

Further, the first step section 97 is formed at a position in the outer circumferential surface 93 of the outer ring 91 separated from the first groove section 94 in the axis O direction when seen from the axis O direction (i.e., a first end surface 93a of the outer circumferential surface 93). The second step section 98 is formed at a position in the outer circumferential surface 93 of the outer ring 91 separated from the second groove section 95 in the axis O direction when seen from a center in the axis O direction (i.e., a second end surface 93b of the outer circumferential surface 93).

The first step section 97 and the second step section 98 are formed on, for example, a tapered surface (an inclined surface), a curved surface, or the like such that a diameter is reduced from a central side in the axis O direction toward an edge of the outer circumferential surface 93. The first step section 97 and the second step section 98 are formed such that a step section depth dimension is D2. The step section depth dimension D2 is larger than a groove depth dimension D1. As shown in FIG. 9, the first and second step sections 97 and 98 have first step portions 97a and 98a outside the groove sections 94 and 95 in the axial direction, and second step portions 97b and 98b outside the first step portions 97a and 98a in the axial direction. The first step portions 97a, 98a have a diameter larger than that of the groove sections 94, 95, and the second step portions 97b, 98b have a diameter smaller than that of the groove sections 94, 95 and which reduces with increasing distance from the first step portions in the axial direction. The groove sections have inner and outer sides spaced apart from one another in the axial direction, and the outer sides of the groove sections constitute inner sides of the adjoining first step portions 97a,98a.

Like the first embodiment, any one of the rubber, thermoplastic elastomer and plastic is welded to the outer circumferential surface 93 of the outer ring 91 through insert molding. Accordingly, the first groove section 94, the second groove section 95, the first step section 97 and the second step section 98 are filled with any one of the rubber, thermoplastic elastomer and plastic, and the enveloping layer 92 is formed. The enveloping layer 92 has a coated outer circumferential surface 101, a coated inner circumferential surface 102 and a pair of coated side surfaces 103 and 104. Hereinafter, one coated side surface of the pair of coated side surfaces 103 and 104 is referred to as a first coated side surface 103, and the other coated side surface is referred to as a second coated side surface 104.

The coated inner circumferential surface 102 is welded to the outer circumferential surface 93, the first groove section 94, the second groove section 95, the first step section 97 and the second step section 98 of the outer ring 91. In this state, the first groove section 94, the second groove section 95, the first step section 97 and the second step section 98 of the outer circumferential surface 93 are filled with protrusions 92a to 92d of the enveloping layer 92. Accordingly, the first groove section 94, the second groove section 95, the first step section 97 and the second step section 98 of the outer circumferential surface 93 can be engaged with the protrusions 92a to 92d of the enveloping layer 92 in a concavo-convex shape. Accordingly, when a force is applied to the enveloping layer 92, removal of the enveloping layer 92 from the outer ring 91 can be prevented by a concavo-convex structure between the outer circumferential surface 93 and the enveloping layer 92.

As the enveloping layer 92 is insert-molded of any one of rubber, a thermoplastic elastomer and a plastic on the outer circumferential surface 93 of the outer ring 91, like the first embodiment, a process in which the outer circumferential surface 93 of the outer ring 91 is processed to become rough through sandblast or a process of applying an adhesive agent to the outer circumferential surface 93 that has been processed to become rough may be unnecessary.

In addition, in the thermoplastic elastomer, as with urethane rubber, it is possible to eliminate a long curing process in the mold.

Accordingly, the bearing 90 having the enveloping layer 92 formed on the outer circumferential surface 93 of the outer ring 91 can be manufactured at a low cost in large quantities. Further, separation of the enveloping layer 92 from the outer circumferential surface 93 (i.e., the outer ring 91) can be prevented.

In addition, as the enveloping layer 92 is welded to the outer circumferential surface 93, the enveloping layer 92 need not be adhered to the outer circumferential surface 93 by an adhesive agent. Accordingly, even when a thickness dimension of the enveloping layer 92 is less than 1.0 mm, hardness of the enveloping layer 92 can be evenly maintained throughout the circumference. Accordingly, even when the bearing 90 is formed in a compact shape, generation of sound (noise) or causing of torque nonuniformity can be minimized when the conveyance object is conveyed by the bearing 90 or when the bearing 90 rolls along the contact object 5 (see FIG. 4).

The first groove section 94 and the second groove section 95 are formed at both sides of a center of the outer circumferential surface 93 of the outer ring 91 in the axis O direction at an interval. Accordingly, the first groove section 94 and the second groove section 95 can be separated in the axis O direction from the outer ring rolling surface 29 in the axis O direction. Accordingly, an influence of deformation of the outer ring 91 or a decrease in rigidity of the outer ring 91 due to the first groove section 94 and the second groove section 95 on the outer ring rolling surface 29 can be minimized. Further, as the first groove section 94 and the second groove section 95 are filled with any one of rubber, a thermoplastic elastomer and a plastic, the enveloping layer 92 can be strongly engaged with the outer circumferential surface 93 of the outer ring 91 in a concavo-convex shape.

In addition, the first step section 97 and the second step section 98 are formed on both of the end surfaces 93a and 93b of the outer circumferential surface 93. Accordingly, the enveloping layer 92 can be more strongly engaged with the outer circumferential surface 93 of the outer ring 91 in the concavo-convex shape, and separation of the enveloping layer 92 from the outer circumferential surface 93 (i.e., the outer ring 91) can be prevented.

Further, the step section depth dimension D2 of the first step section 97 and the second step section 98 is set to be larger than the groove depth dimension D1 of the first groove section 94 and the second groove section 95. Accordingly, a welding area of the first step section 97 and the second step section 98 with respect to any one of rubber, a thermoplastic elastomer and a plastic can be largely secured, and a filling amount of any one of the rubber, thermoplastic elastomer and plastic with respect to the first step section 97 and the second step section 98 can be increased. Accordingly, the enveloping layer 92 can be strongly engaged with the outer circumferential surface 93 in a concavo-convex shape, and separation of the enveloping layer 92 from the outer circumferential surface 93 (i.e., the outer ring 91) can be more securely prevented.

In particular, the first step section 97 and the second step section 98 are formed on both of the end surfaces 93a and 93b of the outer circumferential surface 93. Accordingly, for example, when a moment load F1 is applied to the first coated side surface 103 of the enveloping layer 92 as shown by an arrow, stripping-off of the enveloping layer 92 from the outer circumferential surface 93 and removal of the enveloping layer 92 from the outer ring 91 can be suppressed by the first step section 97. Accordingly, separation of the enveloping layer 92 from the outer circumferential surface 93 can be more appropriately prevented.

In addition, the first step section 97 and the second step section 98 are formed on both of the end surfaces 93a and 93b of the outer circumferential surface 93. Accordingly, even when the step section depth dimension D2 of the first step section 97 and the second step section 98 is larger than the groove depth dimension D1 of the first groove section 94 and the second groove section 95, it is unlikely to reduce rigidity of the outer ring 91 and exert an influence on the outer ring rolling surface 29.

Further, the first step section 97 and the second step section 98 can minimize the cutting resistance of the cutting edge to a smaller level in comparison with the case in which the groove section is processed. Accordingly, the first step section 97 and the second step section 98 can be processed without decreasing the lifespan of the cutting edge.

In addition, the groove depth dimension D1 of the first groove section 94 and the second groove section 95 is set to be smaller than the step section depth dimension D2 of the first step section 97 and the second step section 98. Accordingly, the cutting resistance when the first groove section 94 and the second groove section 95 are processed by the cutting edge can be minimized to a small level, and processing of the first groove section 94 and the second groove section 95 becomes easy. Further, a lifespan of the cutting edge can be extended by minimizing the cutting resistance of the cutting edge to a small level.

Seventh Embodiment

Figure 10:
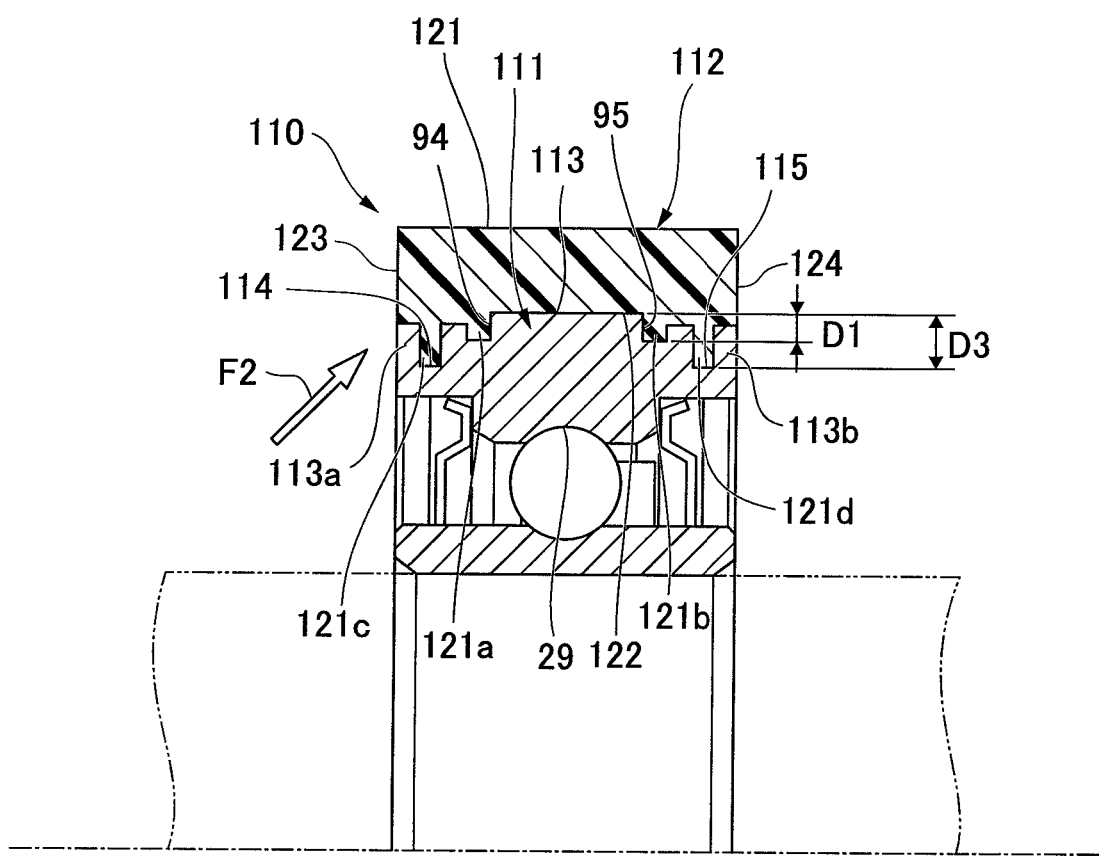
FIG. 10 is a cross-sectional view showing a bearing according to a seventh embodiment of the present invention.

FIG. 10 is a cross-sectional view of a bearing 110 according to a seventh embodiment.

As shown in FIG. 10, the bearing 110 is obtained by replacing the outer ring 91 and the enveloping layer 92 of the sixth embodiment with an outer ring 111 and an enveloping layer 112, and other configurations are the same as those of the bearing 90 of the sixth embodiment.

The outer ring 111 has a first groove section 94, the second groove section 95, a third groove section 114 and a fourth groove section 115 formed on an outer circumferential surface 113. The first groove section 94 and the second groove section 95 are formed symmetrically with respect to a center of the outer ring 111 in the axis O direction at an interval in the axis O direction like the sixth embodiment.

The third groove section 114 and the fourth groove section 115 are formed symmetrically with respect to a center of the outer ring 111 in the axis O direction. Specifically, the third groove section 114 is formed at a position in the outer circumferential surface 113 of the outer ring 111 separated from the first groove section 94 when seen from a center in the axis O direction (i.e., a first end surface 113a of the outer circumferential surface 113). The fourth groove section 115 is formed at a position in the outer circumferential surface 113 of the outer ring 111 separated from the second groove section 95 when seen from a center in the axis O direction (i.e., a second end surface 113b of the outer circumferential surface 113).

Like the first groove section 94 and the second groove section 95, the third groove section 114 and the fourth groove section 115 have a cross-sectional shape that is, for example, a U-shaped surface (a rectangular surface), and the groove depth dimension is formed as D3. The cross-sectional shape of the third groove section 114 and the fourth groove section 115 may also be a curved surface, a V-shaped surface or a U-shaped surface.

Further, in addition to the first groove section 94, the second groove section 95, the third groove section 114 and the fourth groove section 115, like the first embodiment to the fifth embodiment, the groove section may be formed at a center of the outer ring 111 in the axis O direction.

The third groove section 114 and the fourth groove section 115 have a groove depth dimension that is set as D3. The groove depth dimension D3 of the third groove section 114 and the fourth groove section 115 is larger than the groove depth dimension D1 of the first groove section 94 and the second groove section 95.

Like the first embodiment, any one of rubber, a thermoplastic elastomer and a plastic is welded to the outer circumferential surface 113 of the outer ring 111 by insert molding. Accordingly, the first groove section 94, the second groove section 95, the third groove section 114 and the fourth groove section 115 are filled with any one of the rubber, thermoplastic elastomer and plastic, and the enveloping layer 112 is formed.

The enveloping layer 112 has a coated outer circumferential surface 121, a coated inner circumferential surface 122, and a pair of coated side surfaces 123 and 124. Hereinafter, one coated side surface of the pair of coated side surfaces 123 and 124 is referred to as a first coated side surface 123, and the other coated side surface is referred to as a second coated side surface 124.

The coated inner circumferential surface 122 is welded to the outer circumferential surface 113, the first groove section 94, the second groove section 95, the third groove section 114 and the fourth groove section 115 of the outer ring 111. In this state, the first groove section 94, the second groove section 95, the third groove section 114 and the fourth groove section 115 of the outer circumferential surface 113 are filled with protrusions 121a to 121d of the enveloping layer 112. Accordingly, the first groove section 94, the second groove section 95, the third groove section 114 and the fourth groove section 115 of the outer circumferential surface 113 can be engaged with the protrusions 121a to 121d of the enveloping layer 112 in a concavo-convex shape. Accordingly, when a force is applied to the enveloping layer 112, removal of the enveloping layer 112 from the outer ring 111 can be prevented by a concavo-convex structure between the outer circumferential surface 113 and the enveloping layer 112.

The enveloping layer 112 is insert-molded of any one of rubber, a thermoplastic elastomer and a plastic on the outer circumferential surface 113 of the outer ring 111. Accordingly, like the first embodiment, a process in which the outer circumferential surface 93 of the outer ring 111 is processed to become rough through sandblast or a process of applying an adhesive agent to the outer circumferential surface 93 that has been processed to become rough may be unnecessary.

In addition, in the case of a thermoplastic elastomer, as with urethane rubber, it is possible to eliminate a long curing process in the mold.

Accordingly, the bearing 110 having the enveloping layer 112 formed on the outer circumferential surface 113 of the outer ring 111 can be manufactured at a low cost in large quantities. Further, separation of the enveloping layer 112 from the outer circumferential surface 113 (i.e., the outer ring 111) can be prevented.

In addition, as the enveloping layer 112 is welded to the outer circumferential surface 113, the enveloping layer 112 need not be adhered to the outer circumferential surface 113 by an adhesive agent. Accordingly, even when the thickness dimension of the enveloping layer 112 is less than 1.0 mm, hardness of the enveloping layer 112 can be evenly maintained throughout the circumference. Accordingly, even when the bearing 110 is formed in a compact shape, generation of sound (noise) or causing of torque nonuniformity can be minimized when the conveyance object is conveyed by the bearing 110 or when the bearing 110 rolls along the contact object 5 (see FIG. 4).

The first groove section 94 and the second groove section 95 are formed at both sides of a center of the outer circumferential surface 113 of the outer ring 111 in the axis O direction. Accordingly, the first groove section 94 and the second groove section 95 can be separated in the axis O direction from the outer ring rolling surface 29 in the axis O direction. Accordingly, an influence of deformation of the outer ring 111 or a decrease in rigidity of the outer ring 111 due to the first groove section 94 and the second groove section 95 on the outer ring rolling surface 29 can be minimized. Further, as the first groove section 94, the second groove section 95, the third groove section 114 and the fourth groove section 115 are filled with any one of rubber, a thermoplastic elastomer and a plastic, the enveloping layer 112 can be strongly engaged with the outer circumferential surface 113 of the outer ring 111 in a concavo-convex shape. Accordingly, separation of the enveloping layer 112 from the outer circumferential surface 113 (i.e., the outer ring 111) can be prevented.

Further, the groove depth dimension D3 of the third groove section 114 and the fourth groove section 115 is set to be larger than the groove depth dimension D1 of the first groove section 94 and the second groove section 95. Accordingly, a welding area of the third groove section 114 and the fourth groove section 115 with respect to any one of rubber, a thermoplastic elastomer and a plastic can be largely secured, and a filling amount of any one of the rubber, thermoplastic elastomer and plastic with respect to the third groove section 114 and the fourth groove section 115 can be increased. Accordingly, the enveloping layer 112 can be strongly engaged with the outer circumferential surface 113 in a concavo-convex shape, and separation of the enveloping layer 112 from the outer circumferential surface 113 (i.e., the outer ring 111) can be more securely prevented.

In particular, the third groove section 114 and the fourth groove section 115 are formed at both end surfaces 113a and 113b of the outer circumferential surface 113. Accordingly, for example, when a moment load F2 is applied to the first coated side surface 123 of the enveloping layer 112 as shown by an arrow, stripping-off of the enveloping layer 112 from the outer circumferential surface 113 and removal of the enveloping layer 112 from the outer ring 111 can be minimized by the third groove section 114. Accordingly, separation of the enveloping layer 112 from the outer circumferential surface 113 can be more appropriately prevented.

In addition, the third groove section 114 and the fourth groove section 115 are formed on both end surfaces 113a and 113b of the outer circumferential surface 113. Accordingly, even when the groove depth dimension D3 of the third groove section 114 and the fourth groove section 115 is set to be larger than the groove depth dimension D1 of the first groove section 94 and the second groove section 95, it is unlikely to decrease rigidity of the outer ring 111 or exert an influence on the outer ring rolling surface 29.

Further, the groove depth dimension D1 of the first groove section 94 and the second groove section 95 is set to be larger than the groove depth dimension D3 of the third groove section 114 and the fourth groove section 115. Accordingly, cutting resistance when the first groove section 94 and the second groove section 95 are processed by a cutting edge can be minimized to a small level, and processing of the first groove section 94 and the second groove section 95 becomes easy. Further, a lifespan of the cutting edge can be extended by minimizing the cutting resistance of the cutting edge to a small level.

Further, the technical scope of the present invention is not limited to the above-mentioned embodiments, and various modifications may be made without departing from the spirit of the present invention.

While the enveloping layers 18, 52, 72, 92 and 112 of the bearings 10, 50, 60, 70, 80, 90 and 110 used for rotating and sliding have been described in the first embodiment to the seventh embodiment, there is no limitation thereto. Another example may be applied to a member (replaced with an O-ring) configured to fix another member and the bearings 10, 50, 60, 70, 80, 90 and 110 or an insulating member configured to prevent electric erosion.

In addition, while the example in which the enveloping layers 18, 52, 72, 82, 92 and 112 are formed on the outer circumferential surfaces 24, 93 and 113 of the outer rings 21, 71, 81, 91 and 111 has been exemplarily described in the first embodiment to the seventh embodiment, there is no limitation thereto. As another example, the enveloping layer may be formed on the inner circumferential surface of the inner ring 22.

Further, while the example in which widthwise dimensions of the enveloping layers 18, 52, 72, 82, 92 and 112 are set to be the same as a widthwise dimension of the ring body 12 has been exemplarily described in the first embodiment, the second embodiment, and the fourth embodiment to the seventh embodiment, there is no limitation thereto. As another example, for example, the widthwise dimensions of the enveloping layers 18, 52, 72, 82, 92 and 112 may be set to be smaller than that of the ring body 12. Hereinafter, the enveloping layers 18, 52, 72, 82, 92 and 112 are abbreviated as "the enveloping layer 18 . . . ."

Since the widthwise dimensions of the enveloping layer 18 . . . are decreased, reduction of sound (noise) can be achieved by decreasing a use amount of a material that forms the enveloping layer 18 . . . and reducing contact areas of the coated outer circumferential surfaces 35, 54, 101 and 121 of the enveloping layer 18 . . . .

In addition, while the example in which the widthwise dimensions of the first enveloping layer 62 and the second enveloping layer 64 are set to be the same as the widthwise dimension of the ring body 12 has been exemplarily described in the third embodiment, there is no limitation thereto. As another example, for example, the widthwise dimensions of the first enveloping layer 62 and the second enveloping layer 64 may be set to be smaller than that of the ring body 12.

As the widthwise dimensions of the first enveloping layer 62 and the second enveloping layer 64 are decreased, reduction of sound (noise) can be achieved by decreasing a use amount of a material that forms the first enveloping layer 62 and the second enveloping layer 64 and reducing a contact area of the coated outer circumferential surface 65 of the second enveloping layer 64.

What is claimed is:

1. A bearing having a plurality of rolling elements disposed between an inner ring and an outer ring that are disposed coaxially, wherein:
   a groove section extending in a circumferential direction of an outer circumferential surface of the outer ring outside in a radial direction is formed on the outer circumferential surface,
   an enveloping layer formed of any one of rubber, a thermoplastic elastomer and a plastic is formed on the outer circumferential surface,
   the groove section comprises two groove sections formed on opposite sides of a center of the outer ring in an axial direction, first step portions are formed outside the groove sections in the axial direction, the first step portions having a diameter larger than that of the groove sections and smaller than that of the center of the outer ring in the axial direction, second step portions are formed outside respective first step portions in the axial direction, the second step portions having a diameter smaller than that of the groove sections, and the second step portions are formed such that the diameter of each second step portion is reduced with increasing distance from the center in the axial direction.

2. The bearing according to claim 1, wherein a plurality of groove sections are formed at the both sides of the center, and a groove depth dimension of the outer groove section of the plurality of groove sections when seen from the center is larger than a groove depth dimension of the inner groove section.

3. A bearing having a plurality of rolling elements disposed between an inner ring and an outer ring that are disposed coaxially, wherein:

a groove section extending in a circumferential direction of an outer circumferential surface of the outer ring outside in a radial direction is formed in the outer circumferential surface, an enveloping layer formed of plastic is formed on the outer circumferential surface, the groove section comprises two groove sections formed on opposite sides of a center of the outer ring in an axial direction, first step portions are formed outside the groove sections in the axial direction, the first step portions having a diameter larger than that of the groove sections and smaller than that of the center of the outer ring in the axial direction, second step portions are formed outside respective first step portions in the axial direction, the second step portions having a diameter smaller than that of the groove sections, the second step portions are formed such that the diameter of each second step portion is reduced with increasing distance from the center in the axial direction, and a plurality of gear teeth are formed on an outer circumferential surface of the enveloping layer.

4. A rolling bearing comprising:

an outer ring;

an inner ring disposed inside and radially spaced from the outer ring in a radial direction and coaxial with the outer ring in an axial direction;

rolling elements rollably disposed between and in rolling contact with the outer and inner rings; and an enveloping layer formed on an outer circumferential surface of the outer ring, wherein the outer circumferential surface of the outer ring has, extending circumferentially therearound, a central section, groove sections on opposite sides of the central section in the axial direction, and step sections outside respective groove sections in the axial direction, wherein the step sections comprise first step portions outside respective groove sections and second step portions outside respective first step portions in the axial direction, and wherein the first step portions have a diameter larger than that of the groove sections and smaller than that of the central section, and the second step portions have a diameter which is smaller than that of the groove sections and which reduces with increasing distance from the first step portions in the axial direction.

5. The rolling bearing according to claim 4; wherein the outer circumferential surface of the outer ring is symmetrical with respect to a center of the outer ring in the axial direction.

6. The rolling bearing according to claim 5; wherein an outer side of each groove section in the axial direction constitutes an inner side of its respective first step portion in the axial direction.

7. The rolling bearing according to claim 6; wherein the second step portions taper outwardly from the first step portions.

8. The rolling bearing according to claim 4; wherein an outer side of each groove section in the axial direction constitutes an inner side of its respective first step sections in the axial direction.

* * * * *